US012602415B1

(12) United States Patent
Huang

(10) Patent No.: US 12,602,415 B1
(45) Date of Patent: Apr. 14, 2026

(54) INTER-DOCUMENT SEARCH USING KNOWLEDGE-ENRICHED VECTORS

(71) Applicant: DocuSign, Inc., San Francisco, CA (US)

(72) Inventor: Yangcheng Huang, Dublin (IE)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/398,271

(22) Filed: Dec. 28, 2023

(51) Int. Cl.
  *G06F 16/334* (2025.01)
  *G06F 16/93* (2019.01)

(52) U.S. Cl.
  CPC ............ *G06F 16/334* (2019.01); *G06F 16/93* (2019.01)

(58) Field of Classification Search
  CPC ............................... G06F 16/334; G06F 16/93
  See application file for complete search history.

(56) References Cited

U.S. PATENT DOCUMENTS

| | | | | |
|---|---|---|---|---|
| 11,263,277 B1 * | 3/2022 | Podgorny | ........... | G06F 16/3329 |
| 2022/0050847 A1 * | 2/2022 | Scebold | .............. | G06F 16/9032 |
| 2022/0138170 A1 * | 5/2022 | Misiewicz | ............... | G06N 5/02 |
| | | | | 707/737 |
| 2022/0253477 A1 * | 8/2022 | Lipka | ..................... | G06N 20/00 |
| 2023/0350931 A1 * | 11/2023 | Lewis | ................... | G06F 16/338 |
| 2023/0418868 A1 * | 12/2023 | Seonwoo | .............. | G06F 16/313 |
| 2024/0143638 A1 * | 5/2024 | Maya | .................. | G06F 16/3347 |
| 2024/0403601 A1 * | 12/2024 | Whang | .................. | G06N 3/042 |

* cited by examiner

*Primary Examiner* — William P Bartlett
(74) *Attorney, Agent, or Firm* — KDW FIRM PLLC

(57) ABSTRACT

A method, an apparatus, and a computer-readable storage medium for searching of electronic documents. A search query is encoded to form a search vector. The search query includes at least one search term and seeks information within a plurality of electronic documents. A knowledge graph structure is generated using at least one search term. The search term is associated with at least another term in a plurality of terms in the knowledge graph structure. The search query is modified using the other term to generate a modified search vector. A response to the search query is generated based on one or more responsive document vectors retrieved from the plurality of electronic documents and that are semantically similar to the modified search vector.

16 Claims, 20 Drawing Sheets

1500

RECEIVE A SEARCH QUERY FOR INFORMATION WITHIN A PLURALITY OF ELECTRONIC DOCUMENTS, THE SEARCH QUERY INCLUDES AT LEAST ONE SEARCH TERM 1502

GENERATE AN EMBEDDING FOR THE SEARCH QUERY TO FORM A SEARCH VECTOR 1504

GENERATE A KNOWLEDGE GRAPH STRUCTURE USING AT LEAST ONE SEARCH TERM 1506

MODIFY THE EMBEDDING FOR THE SEARCH QUERY USING AT LEAST ONE ANOTHER TERM, AND GENERATE A MODIFIED SEARCH VECTOR USING THE SEARCH VECTOR AND THE MODIFIED EMBEDDING 1508

RETRIEVE ONE OR MORE RESPONSIVE DOCUMENT VECTORS FROM THE PLURALITY OF ELECTRONIC DOCUMENTS THAT ARE SEMANTICALLY SIMILAR TO THE MODIFIED SEARCH VECTOR 1510

GENERATE A RESPONSE TO THE SEARCH QUERY BASED ON ONE OR MORE RESPONSIVE DOCUMENT VECTORS 1512

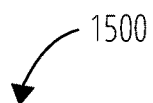
1500

RECEIVE A SEARCH QUERY FOR INFORMATION WITHIN A PLURALITY OF ELECTRONIC DOCUMENTS, THE SEARCH QUERY INCLUDES AT LEAST ONE SEARCH TERM 1502

GENERATE AN EMBEDDING FOR THE SEARCH QUERY TO FORM A SEARCH VECTOR 1504

GENERATE A KNOWLEDGE GRAPH STRUCTURE USING AT LEAST ONE SEARCH TERM 1506

MODIFY THE EMBEDDING FOR THE SEARCH QUERY USING AT LEAST ONE ANOTHER TERM, AND GENERATE A MODIFIED SEARCH VECTOR USING THE SEARCH VECTOR AND THE MODIFIED EMBEDDING 1508

RETRIEVE ONE OR MORE RESPONSIVE DOCUMENT VECTORS FROM THE PLURALITY OF ELECTRONIC DOCUMENTS THAT ARE SEMANTICALLY SIMILAR TO THE MODIFIED SEARCH VECTOR 1510

GENERATE A RESPONSE TO THE SEARCH QUERY BASED ON ONE OR MORE RESPONSIVE DOCUMENT VECTORS 1512

FIG. 15

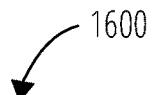

ENCODE A SEARCH QUERY TO FORM A SEARCH VECTOR, THE SEARCH QUERY INCLUDES AT LEAST ONE SEARCH TERM AND SEEKS INFORMATION WITHIN A PLURALITY OF ELECTRONIC DOCUMENTS 1602

↓

GENERATE A KNOWLEDGE GRAPH STRUCTURE USING THE AT LEAST ONE SEARCH TERM 1604

↓

MODIFY THE SEARCH QUERY USING AT LEAST ONE ANOTHER TERM TO GENERATE A MODIFIED SEARCH VECTOR 1606

↓

GENERATE A RESPONSE TO THE SEARCH QUERY BASED ON ONE OR MORE RESPONSIVE DOCUMENT VECTORS RETRIEVED FROM THE PLURALITY OF ELECTRONIC DOCUMENTS AND THAT ARE SEMANTICALLY SIMILAR TO THE MODIFIED SEARCH VECTOR 1608

FIG. 16

1700

GENERATE A KNOWLEDGE GRAPH STRUCTURE USING AT LEAST ONE SEARCH TERM 1702

FORM A SEARCH VECTOR USING AN EMBEDDING GENERATED USING ONE OR MORE QUERIES AND AT LEAST ANOTHER TERM 1704

GENERATE A RESPONSE TO ONE OR MORE QUERIES BASED ON ONE OR MORE RESPONSIVE DOCUMENT VECTORS RETRIEVED FROM THE PLURALITY OF ELECTRONIC DOCUMENTS AND THAT ARE SEMANTICALLY SIMILAR TO THE SEARCH VECTOR 1706

COMPUTER-READABLE STORAGE MEDIUM 1802

COMPUTER EXECUTABLE INSTRUCTIONS 1804

INTER-DOCUMENT SEARCH USING KNOWLEDGE-ENRICHED VECTORS

BACKGROUND

An electronic document management platform allows organizations to manage a growing collection of electronic documents, such as electronic agreements. Preparation of agreements is an extraordinarily complex process that typically involves substantial research into the subject matter of the agreement, parties to the agreement, terms and conditions of the agreement, regulatory requirements (if any), and other information. Once information is assembled, the agreement is prepared and negotiations between parties may ensue. Some agreements may require specific language to be included in its clauses. Moreover, some parties may wish particular wording to be used when certain clauses are included. Other requirements, including regulatory requirements, may also need to be incorporated into the language of the agreement. Inclusion of improper language may cause breakdown in negotiations, agreements to become unenforceable, and result in various other legal problems. Some parties have prior agreements that they have entered into that may be helpful for generation of future agreements. However, such existing agreements may need to be tailored to specific contractual obligations, circumstances, etc. Ensuring that all agreement requirements, conditions, etc. are represented in the final agreements in the proper form is extremely difficult. While existing agreement generation systems are capable of querying agreement storage databases to locate information that may need to be included in new agreements, the queries that these systems execute return incomplete data or, worse, incorrect information.

BRIEF DESCRIPTION OF THE DRAWINGS

To easily identify the discussion of any particular element or act, the most significant digit or digits in a reference number refer to the figure number in which that element is first introduced.

FIG. 15 illustrates an example process for searching of electronic documents, according to some embodiments of the current subject matter.

FIG. 16 illustrates another example process for searching of electronic documents, according to some embodiments of the current subject matter.

FIG. 17 illustrates yet another example process for searching of electronic documents, according to some embodiments of the current subject matter.

DETAILED DESCRIPTION

Figure 1:
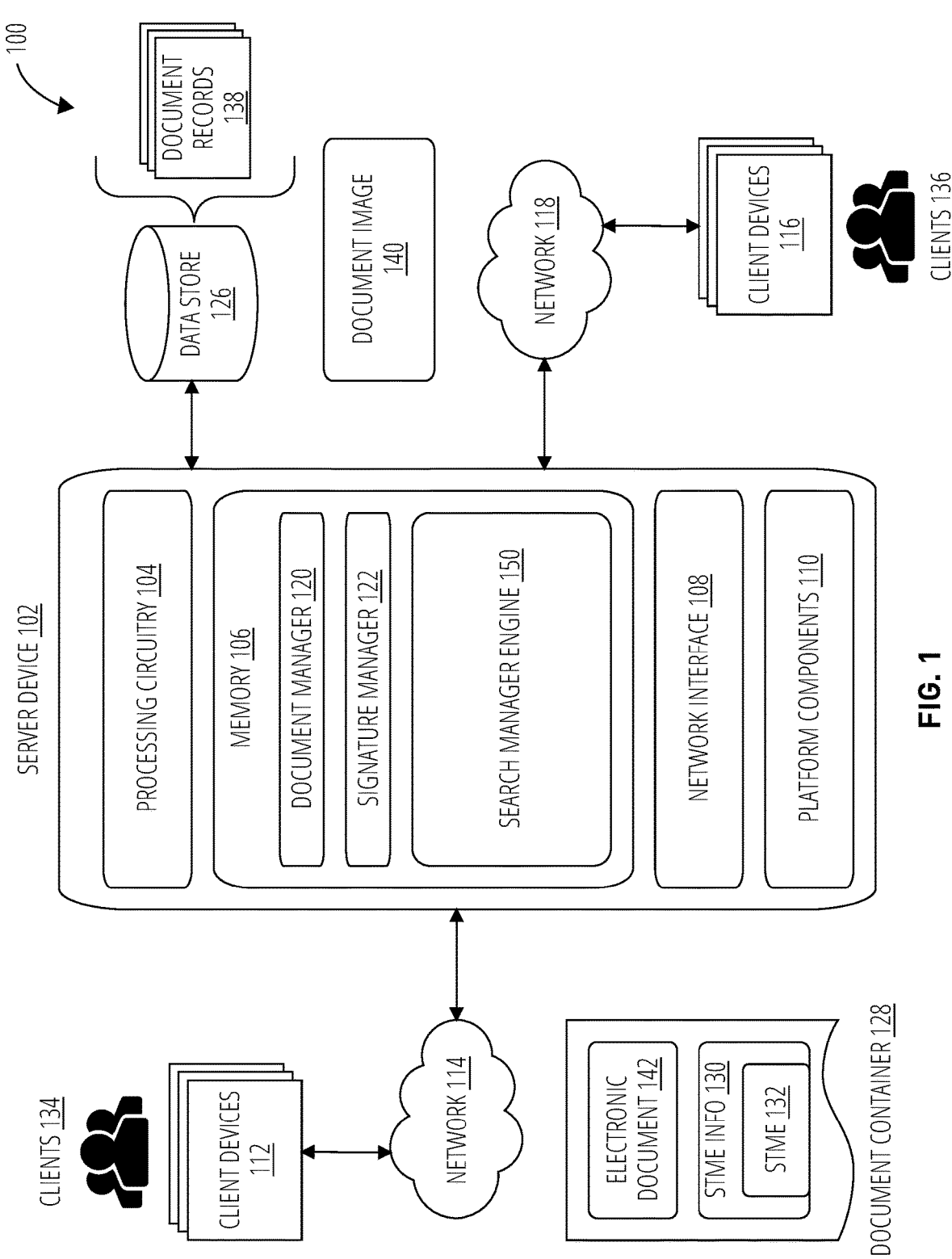
FIG. 1 illustrates an example system, according to some embodiments of the current subject matter.

Embodiments disclosed herein are generally directed to techniques for managing a collection of electronic documents within a document management environment. In general, a document may comprise a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some cases, a user may need to search for information contained within electronic documents. For example, electronic agreements may be lengthy and filled with technical, legal or business terms with complex goals and outcomes. Thus, a user may need to search for information within a collection of electronic documents, such as warranty terms, contractual obligations, pricing information, and so forth. Furthermore, during an electronic signing (e-signing) negotiation or process, multiple parties may make extensive modifications or revisions over time to an electronic agreement. A number of revisions typically increases as a function of a length and complexity of an agreement. Consequently, a user may search electronic documents to find revisions to ensure they are acceptable.

Conventional document management systems typically provide search tools to allow a user to perform searches for information within an electronic document (e.g., intra-document searches) or across multiple electronic documents (e.g., inter-document searches) stored as part of a collection of documents (e.g., a document corpus). However, search tools for an electronic document are typically limited to variations of lexical searches. Lexical searching is a process of searching for a particular word or group of words within a given text or corpus. It involves looking for matches of the specified search terms exactly as they appear in the text, without any variations or alterations in spelling, punctuation, or word order. Lexical searching can be useful in a variety of contexts, such as language analysis, information retrieval, and content management. For example, it can be used to identify instances of a specific keyword or phrase in a large dataset, to extract relevant information from unstructured text, or to monitor online conversations for particular topics or keywords.

While lexical searching can be a useful tool in many situations, it also has some limitations and potential problems. For example, lexical searching only looks for exact matches of the specified search terms, which means that it may miss relevant information that uses similar or related words or phrases. Lexical searching may also return false positives, or instances where the specified search terms appear in the text but are not actually relevant to the desired search results. This can happen, for example, if the search terms appear in a different context or with a different meaning than intended. Lexical searching may also miss instances of the search terms due to differences in spelling, punctuation, or word order. For example, if the search term is "color," it may miss instances of "colour" or "colorful." Some words or phrases may have multiple meanings, which can lead to ambiguity in lexical searching. For example, the word "bank" could refer to a financial institution or the side of a river. One particular challenge for lexical searching is that it does not capture or address contextual differences in words or phrases. The meaning of a word or phrase can depend on the context in which it appears. Lexical searching may miss or misinterpret instances of the search terms if it does not take into account the surrounding text or the overall meaning of the document.

Another particular challenge for lexical searching is that even when matches are found, it may be cumbersome to review the search results. This may be exacerbated when the search results include erroneous information, extraneous information or large blocks of information that require manual review by a user.

Embodiments attempt to solve these and other challenges associated with searching for information within an electronic document and/or across a collection of documents. Some embodiments introduce advanced inter-document search capability that returns results based on semantic similarity with search terms within the search query that may be enhanced using various terms obtained from the collection of electronic documents.

Embodiments implement various artificial intelligence (AI) and machine learning (ML) (AI/ML) techniques to improve searching for information in one or more electronic documents managed by an electronic document management system. In one embodiment, for example, AI/ML techniques are used to improve searching for information from a document corpus of electronic documents, such as electronic documents with an electronic signature ("signed electronic documents") and electronic documents without an electronic signature ("unsigned electronic documents"). In some cases, the document corpus may be associated with a particular entity, such as a customer or client of the electronic document management company, and may therefore contain proprietary, strategic and valuable business information.

The AI/ML techniques are designed to search one or more electronic documents within a document corpus to identify and extract defined sets of information, sometimes referred to herein as "information blocks." The document corpus may include signed electronic documents and unsigned electronic documents associated with a defined entity, such as agreements or contracts for a customer, business or organization. The electronic documents may comprise various multimedia components, such as written text, spoken text, audio, images, videos, web content, animations, and so forth.

In various embodiments, an electronic document management system may implement a set of improved search tools and algorithms to perform lexical searching, semantic searching, and/or a combination of both. In some embodiments, for example, a system may implement semantic searches to improve search results for a user. Semantic search capability can be extremely helpful in quickly locating the relevant information within an electronic document, such as an electronic agreement. It saves time compared to manually going through the entire document and it can be especially useful in cases where the document is exceptionally long or complex.

Semantic searching is a process of searching for information by understanding the meaning behind the search query and the content being searched. It involves analyzing the context, relationships, and connections between words and concepts to provide more accurate and relevant search results. Unlike lexical searching, which relies on exact matches of search terms, semantic searching takes into account the overall meaning and intent of the query, as well as the meaning and relationships between words and phrases within the content being searched. This enables semantic search engines to deliver more precise and personalized results, even when the search terms used may not be an exact match with the content being searched. Semantic searching uses advanced technologies such as natural language processing (NLP), machine learning, and artificial intelligence (AI) to analyze and understand the meaning and relationships between words and concepts in order to provide more accurate and relevant search results. It is particularly useful for searching large and complex datasets, such as scientific papers, legal documents, and other types of unstructured data, where traditional keyword-based searches may not be effective.

While semantic searching provides clear technical advantages over lexical searches, existing semantic search queries periodically provide information that might not be fully responsive to queries or, worse, inaccurate. This is because the search queries typically lack specific details that may be necessary to locate correct information within the corpus of documents. The current subject matter solves this issue by enabling generation of enhanced search queries through use of knowledge graphs generated using the electronic document corpus and one or more terms in the search query. Once the search query is supplemented with information from the document corpus, retrieval of more accurate information is enabled.

In some embodiments, the current subject matter may be configured to receive a search query for searching a corpus of electronic documents that may be stored in a document management system. The search query may include various search terms and see information contained within the electronic document, e.g., "retrieve lease agreement clauses related to termination in the State of California with execution date beginning as of Jan. 1, 2023." In this query, there are several search terms, such as, "lease agreement", "termination", "State of California", "execution date", etc. The current subject matter system may process the query by encoding and generating embedding in the form of vector (e.g., using one or more known encoding pipelines, such as, for example, word2vec, GloVe, BERT for text embeddings, CLIP for image embeddings, Wave2Vec2 for audio embeddings, etc.). The query, which can be a natural language query and/or a multimodal query that may include images, audios, natural language (e.g., text), may be encoded into one or more query embeddings. In some embodiments, the query (and/or query vectors/embeddings) might not and/or does not need to be indexed, and instead, the documents, after being encoded into vectors, may be indexed using various encoding techniques (e.g., KNN, HNSW, IVF, FAISS, etc. encoding methods). The encoding process results in generation of one or more embeddings that may be used to form a search vector. As can be understood, the query may be in any form and may include a natural language representation query.

In some embodiments, the search term(s) contained in the query may be used to build and/or generate one or more knowledge graphs using the corpus of electronic documents. The knowledge graphs may be generated using one or more rules to connect the search term to one or more other terms that may be ascertained from the electronic documents. For example, the search term "lease agreement" may be connected to other terms, e.g., "commercial lease agreement", "residential lease agreement", some of which, in turn, may also be connected to terms "office space", "industrial", "apartment", "house", etc. One or more rules may be used for identification of terms for the knowledge graph (e.g., "commercial lease agreement" needs to be connected to "office", "industrial space", etc., while "residential lease agreement" needs to be connected to "apartment", "house", etc. in the knowledge graph). The rules may define at least one of: one or more connections between terms within a particular electronic document and/or one or more connections between terms in at least two electronic documents in the electronic document corpus. One or more machine learning models may be used to identify one or more terms to connect with the search term and generate the knowledge graphs. The models may be trained using information contained in the electronic documents, queries, as well as feedback from users running the queries.

In some embodiments, a base knowledge graph may be pre-built before queries, without prior knowledge of search terms in particular queries, using the corpus of electronic documents and/or rules. The knowledge graph(s) required for particular queries may be generated by querying the base knowledge graph and extracting the relevant part from the base knowledge graph, using the search terms.

Once the knowledge graph(s) have been generated, the current subject matter may be configured to modify the initial search query to supplement and/or enhance it with the information from the knowledge graph. In some embodiments, the embeddings initially generated for the original search query may be modified using the terms from the knowledge graph(s). Moreover, the embedding may be modified using one or more terms from the knowledge graph as well as the connections between terms in the knowledge graph. The terms and/or connections may be appropriately encoded to form modified embedding(s) so that they can be incorporated into a modified search vector. The embedding may be a contextualized embedding (e.g., based on a context of one or more electronic documents) and may include a vector representation of one or more words having contextual information for the word(s). For example, the contextualized embedding may include at least one of: a word level vector, a sentence level vector, a paragraph level vector, and any combination thereof.

The modified search vector may then be used to execute the modified search query on the electronic document corpus in order to retrieve one or more responsive document vectors from the plurality of electronic documents that may be semantically similar to the modified search vector. Upon receiving "hits" to the execution of the search, a response to the search query may be presented to the user.

Embodiments may include a method, apparatus, system and computer-readable medium (CRM) that includes various structures and circuitry to implement functions or operations to facilitate searching of electronic documents to produce improved search results. The embodiments may reduce an amount of time needed to review electronic documents, such as electronic agreements that are subject to a negotiation process and multiple revisions. Embodiments help a user to understand important information such as terms and conditions, risks, payment terms, and other legal and business provisions. Embodiments empower customers and signatories to act timely on agreements. These advantages are achieved by providing more comprehensive and more accurate search results from electronic documents to bring salient and actionable information in the electronic documents to the forefront for analysis by a user.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by Docu-Sign®, Inc., located in San Francisco, California ("Docu-Sign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMA, technologies and products as well. For example, the system 100 may be implemented as an online signature system, online document creation and management system, an online work-flow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organization to amass a significant number of electronic documents, including both signed electronic documents and unsigned electronic documents. As such, the system 100 may need to manage a large collection of electronic documents for different entities, a task that is sometimes referred to as contract lifecycle management (CLM). An overview of the workflows and processes used to support CLM operations, including searching and summarizing search results, is described in more detail below.

As depicted in FIG. 1, the system 100 may comprise a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 19:
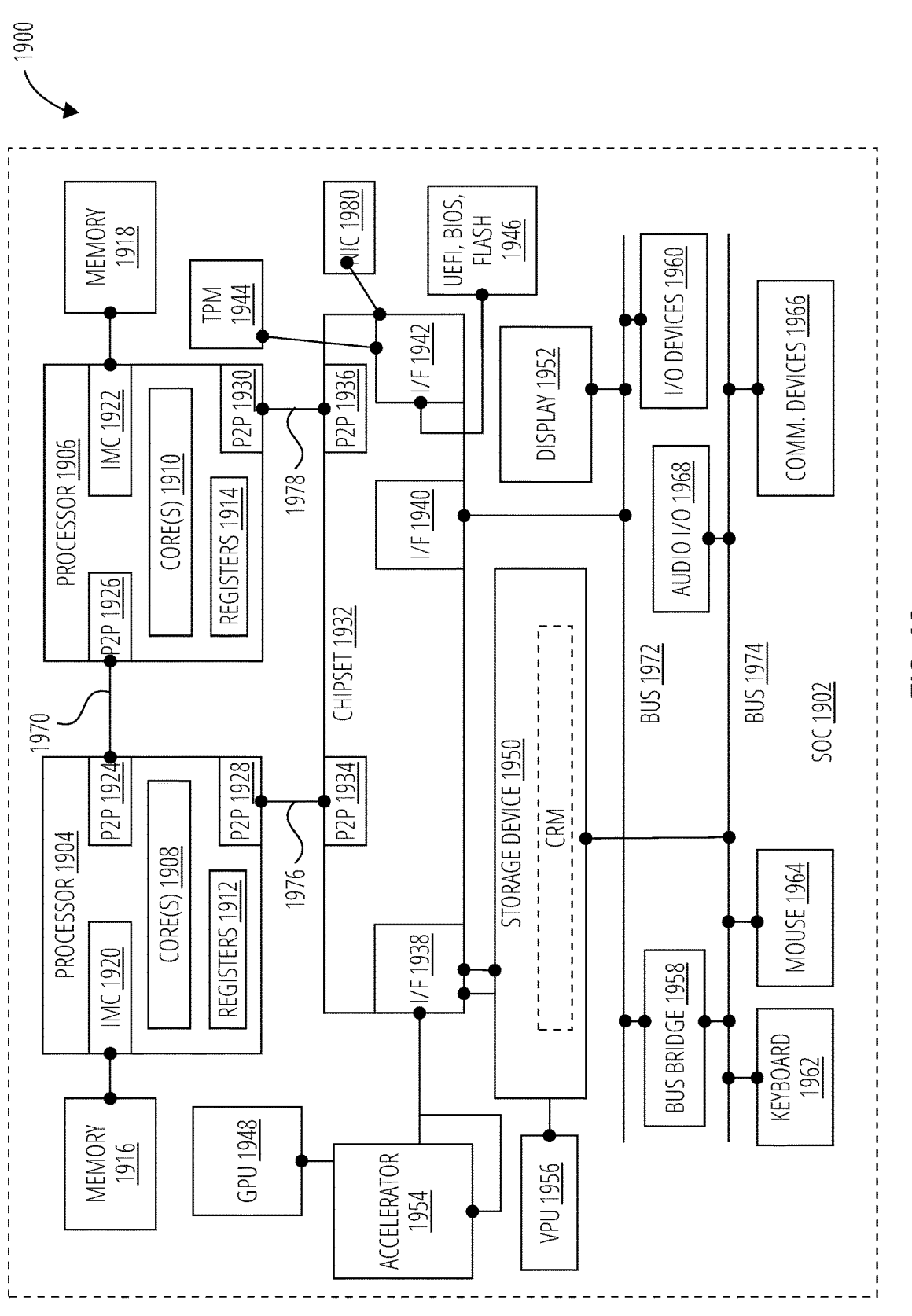
FIG. 19 illustrates a computing architecture, according to some embodiments of the current subject matter.

In various embodiments, the server device 102 may comprise various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 1900 as depicted in FIG. 19.

Figure 20:
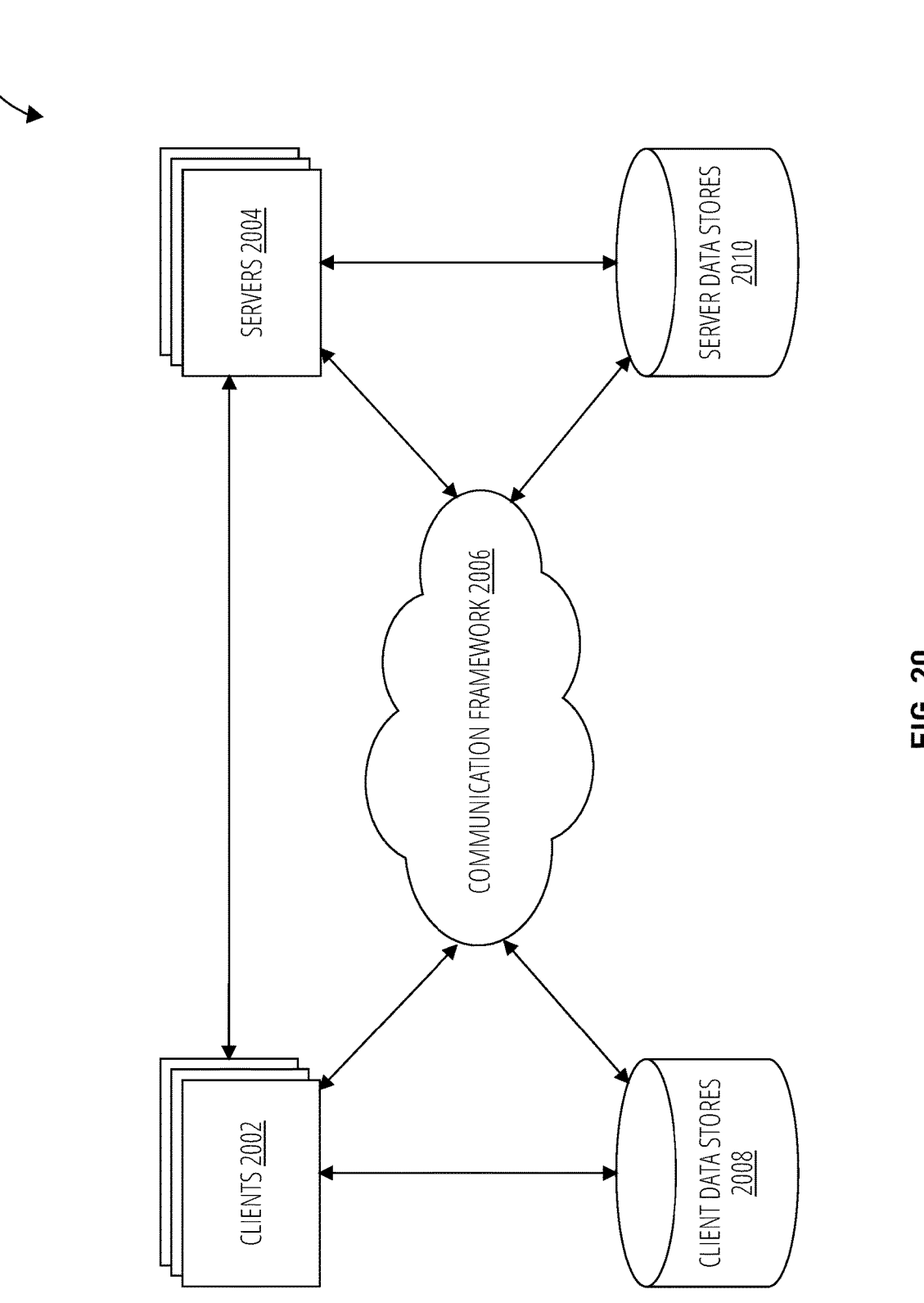
FIG. 20 illustrates a communications architecture, according to some embodiments of the current subject matter.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 2000 as depicted in FIG. 20.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may comprise a document manager 120, a signature manager 122, and a search manager engine 150, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more workflows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may comprise one or more STME 132, which are graphical user interface (GUI) elements superimposed on the electronic document 142. The GUI elements may comprise textual elements, visual elements, auditory elements, tactile elements, and so forth. In one embodiment, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and workflows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140 and send the signed document image 140 to the server device 102 for verification, recordation, and storage.

Figure 4:
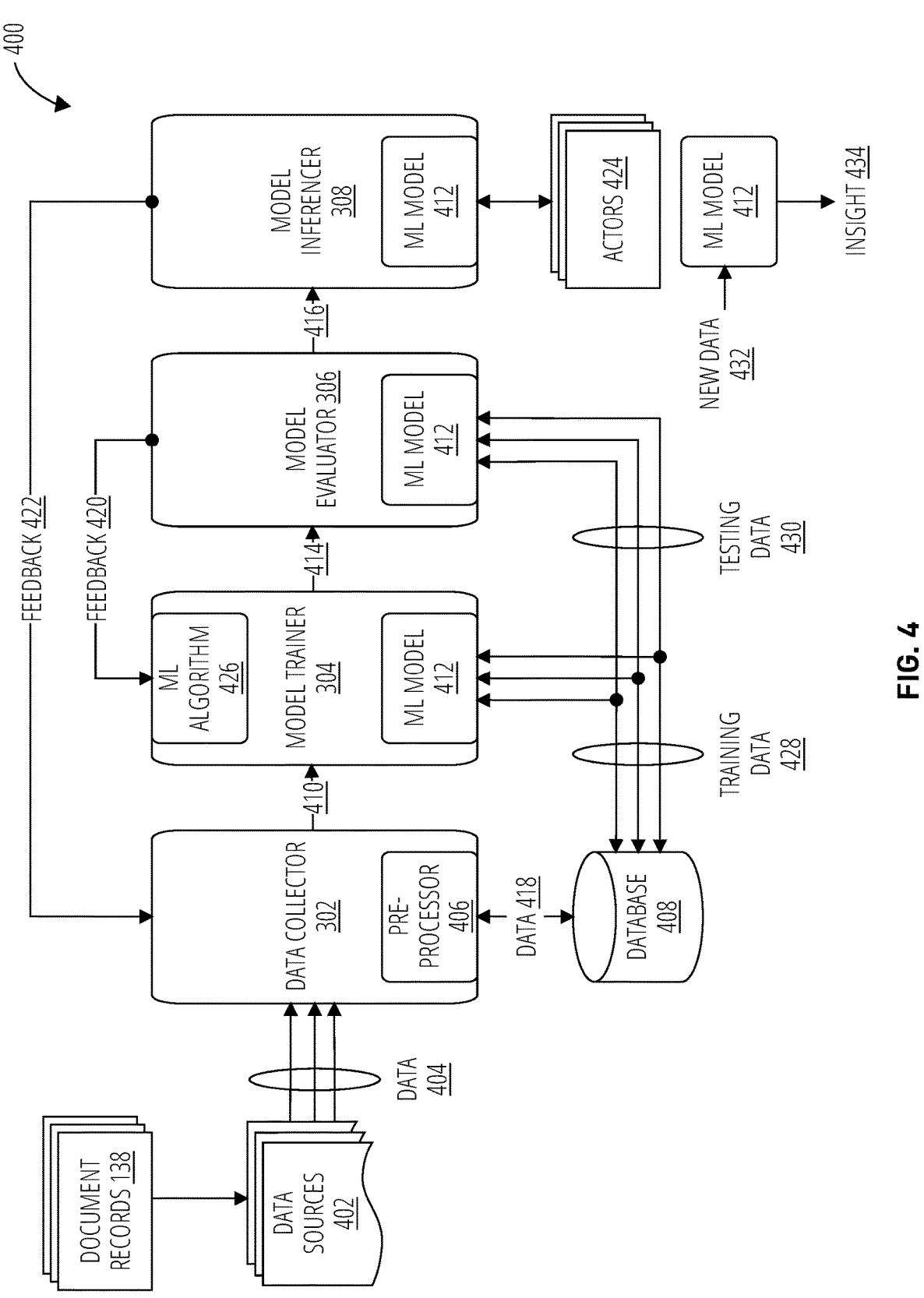
FIG. 4 illustrates an artificial intelligence architecture, according to some embodiments of the current subject matter.

The search manager engine 150 may generally manage artificial intelligence (AI) and machine learning (ML) agents to assist in various operational tasks for the EDMP of the system 100. The search manager engine 150, and associated software elements, are described in more detail with reference to an artificial intelligence architecture 400 as depicted in FIG. 4. The search manager engine 150, and associated hardware elements, are described in more detail with reference to a computing architecture 1900 as depicted in FIG. 19.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 618 with tools, applications, and workflows developed by DocuSign. For example, the electronic documents 618 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more workflows developed by Adobe Systems Incorporated. The STME 132 input may be received from and generated by workflows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

In addition, the system 100 may include a search manager engine 150. The search manager engine 150 may implement a set of improved search tools and algorithms to execute enhanced searches of electronic documents stored in the document management system. In some embodiments, for example, the search manager engine 150 may implement enhanced semantic searches to improve search results for a user.

In some embodiments, the search manager engine 150 may be configured to receive one or more search queries seeking information contained in one or more electronic documents. The search query may, for example, seek information related to termination clauses in lease agreements signed in the State of California. The search query may include one or more search terms (e.g., "termination clause(s)", "lease agreement(s)", "State of California", etc.). The search manager engine 150 may then encode the search query. Query encoding may involve generation of one or more embeddings based on the search query terms using one or more machine learning models (e.g., using one or more known encoding pipelines, such as, for example, word2vec, GloVe, BERT for text embeddings, CLIP for image embeddings, Wave2Vec2 for audio embeddings, etc.). The query, which can be a natural language query and/or a multimodal query that may include images, audios, natural language (e.g., text), may be encoded into one or more query embeddings. In some embodiments, the query (and/or query vectors/embeddings) might not and/or does not need to be indexed, and instead, the documents, after being encoded into vectors, may be indexed using various encoding techniques (e.g., KNN, HNSW, IVF, FAISS, etc. encoding methods). The embeddings may be used to form a search vector, which may be used to search electronic documents for the information identified in the query.

The search manager engine 150 may then generate a knowledge graph structure using the search term(s). A knowledge graph structure may provide a more flexible way to store data. It may allow data to be stored as an interconnected network rather than being restricted to a predefined traditional tabular format. For example, agreement or contract data is highly interconnected both within the agreement but also across a plurality of agreements, e.g., the value of a term in one agreement clause may have an impact on possible values in other agreement(s)'s clauses. The search manager engine 150 may be configured to generate a knowledge graph structure based on the search terms and any connections between the search terms and other terms (e.g., in the same or other electronic documents) to streamline the contracting process and make the data easily available to its users.

Using the information from the knowledge graph, and in particular, connections between search term(s) and other terms as well as connections therebetween, the search manager engine 150 may modify the search query using other terms and/or connections. The engine 150 may then generate a modified search vector. The modified vector may be used to search the electronic documents to retrieve one or more responsive document vectors that are semantically similar to the modified search vector.

In some embodiments, the search manager engine 150 may generate the knowledge graph structure by identifying, using the search term(s) contained in the search query, one or more rules for associating the search term with other term(s). For example, a search term of "lease agreement" may be connected to "commercial", which may in turn, be required to be connected to "county", "city", "town", etc., where the latter, may be required to be connected to "local lease ordinances". The rules may govern any required connections and/or connected terms. Each connection/connected term may be identified using one or more identifiers and/or other metadata that, upon being read by the search manager engine 150, may trigger the search manager engine 150 to create connections to the search term and/or to/between other terms. Once the search manager engine 150 has analyzed the rules and determined required connections/terms (and/or any optional connection/terms), the engine 150 may connect the search term(s) with other another term using at least one connection to form the knowledge graph structure.

In some embodiments, the search manager engine 150 may modify the search query by modifying one or more embeddings that it has previously generated. The engine 150 may modify the query using at least one of: one or more terms, one or more connections, and/or any combinations thereof.

In some embodiments, the embeddings generated by the search manager engine 150 may be contextualized embedding(s), which may include a vector representation of one or more words having contextual information for such word(s). Moreover, the contextualized embedding may include at least one of: a word level vector, a sentence level vector, a paragraph level vector, and any combination thereof.

Further, it should be noted that search queries may be received in any desired format, such as for example, a natural language representation of a human language, such as English, French, Spanish, Korean, etc. In some embodiments, the search manager engine 150 may access a generative AI remotely on another server device. In the latter scenario, the search manager engine 150 may send a natural language generation (NLG) request to a generative AI model implemented on another device over a network. The generative AI model may comprise a machine learning model that implements a large language model (LLM) to support natural language processing (NLP) operations, such as natural language understanding (NLU), natural language generation (NLG), and other NLP operations. In some embodiments, any search results that are generated by the search manager engine 150 may include one or more candidate document vectors that may be matching the modified vector. The search manager engine 150 may provide the results of the search and/or the candidate document vectors to a user via a graphical user interface (GUI) on a client device.

Figure 2:
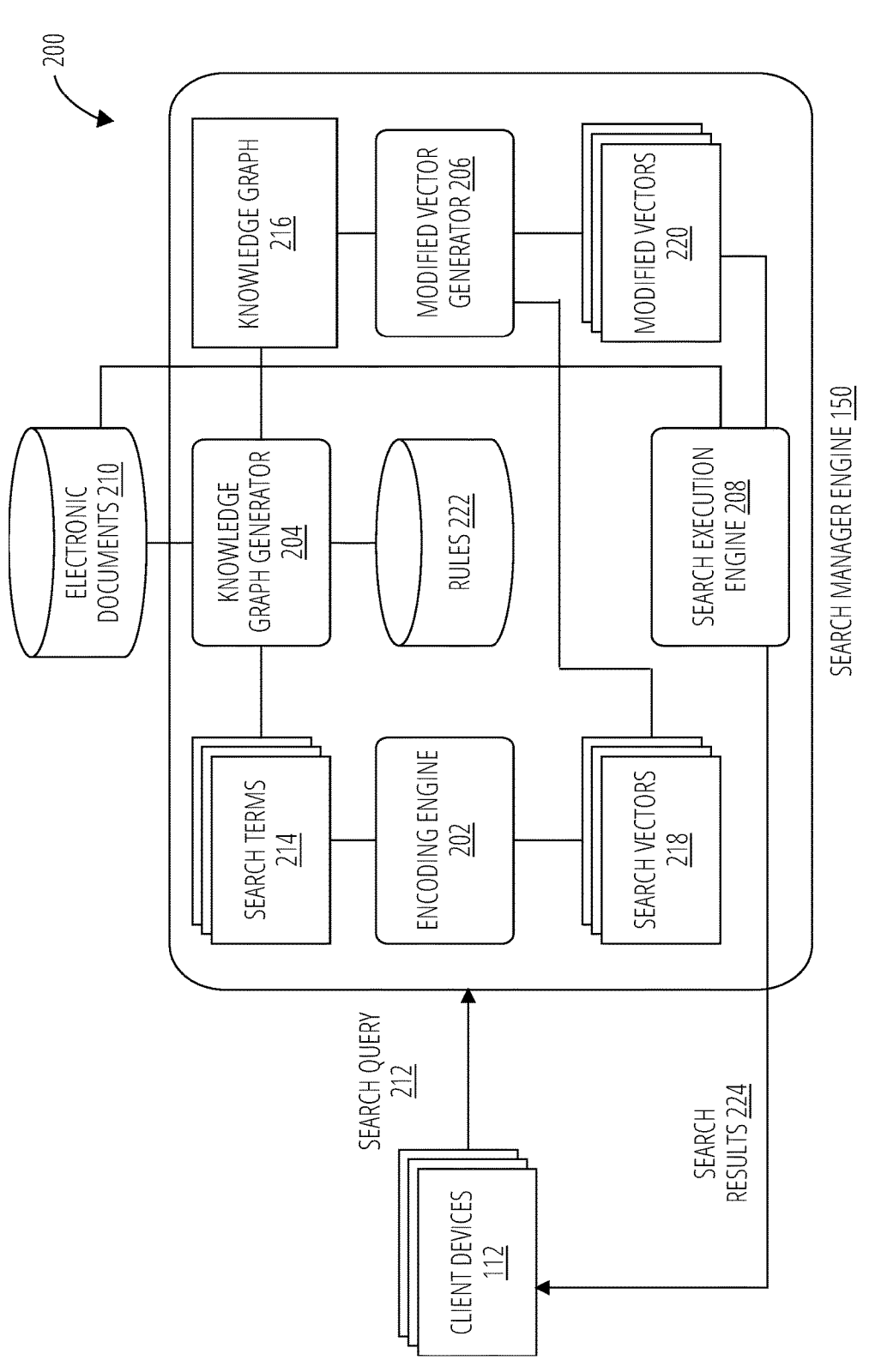
FIG. 2 is an example of system illustrating the operation of the search manager engine, according to some embodiments of the current subject matter.

FIG. 2 is an example of system 200 illustrating operation of the search manager engine 150, according to some embodiments of the current subject matter. The search manager 150 may include an encoding engine 202, a knowledge graph generator 204, a modified vector generator 206, and a search execution engine 208. The engine 150 may be communicatively coupled to one or more client devices 112 and may receive one or more search queries 212 from the client devices 112. As a result of operations performed by the engine 150, the client devices 112 may receive one or more search results 224 from the search manager engine 150, and in particular, its search execution engine 208.

One or more components of the system 200 shown in FIG. 2 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 200 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 200 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 200 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touchscreen, microphone, digital camera, video recorder or camcorder. These devices may be used to enter information and interact with the software and other devices described herein.

In some example embodiments, one or more components of the system 200 may execute one or more applications, such as software applications, that enable, for example, network communications with one or more components of system and transmit and/or receive data.

One or more components of the system 200 may include and/or be in communication with one or more servers via one or more networks and may operate as a respective front-end to back-end pair with one or more servers. One or more components of the system may transmit, for example from a mobile device application (e.g., executing on one or more user devices (e.g., client devices 112, components, etc.), one or more requests to one or more servers. The requests may be associated with retrieving data from servers (e.g., retrieving one or more electronic documents from document storage sources 210). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 200 may include one or more networks, such as, for example, networks that may be communicatively coupling the engine 150, the document storage sources 210, and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 804.11b, 804.15.1, 804.11n and 804.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 804.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 200 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 200 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

As shown in FIG. 2, the search manager engine 150 may be configured to receive one or more search queries 212 from one or more client devices 112. The query 212 may be transmitted in any desired format. For example, the query may be in a natural language representation of a human language (e.g., English, French, Spanish, Korean, etc.) and/or in any other representation and/or language (e.g., SQL, Java, etc.). To process the query, the engine 150 may access a generative artificial intelligence (AI) model remotely, which may implement a large language model (LLM), and that may process natural language processing (NLP) operations, such as natural language understanding (NLU), natural language generation (NLG), and other NLP operations. Once the query is processed by the generative AI model, it may be sent to the search manager engine 150 for further processing. The generative AI model may be part of the system 200 and/or be one or more third party models (e.g., ChatGPT, Bard, DALL-E, Midjourney, DeepMind, etc.).

The query may seek information contained in one or more electronic documents stored in the electronic documents source 210. For example, the query may request information related to termination clauses in lease agreements executed in the State of California. The engine 150 may be configured to execute a search across one or more electronic documents in the data source 210 to retrieve relevant information. The retrieved information may include specific clauses, sentences, words, paragraphs, portions of agreements, entire agreements, etc.

Electronic documents source 210 may be configured to be one or more private databases, access to which might not be publicly available (e.g., internal company databases, specific user access databases, etc.). The electronic documents stored in these databases may be organized in a predetermined fashion, which may allow ease of access to the electronic documents and/or any portions thereof. For example, electronic documents stored in these databases may be labeled, searchable, and/or otherwise, easily identifiable. The documents may be stored in a particular electronic format (e.g., PDF, .docx, etc.).

Alternatively, or in addition, electronic documents source 210 may be configured to be public non-government databases, government databases (e.g., SEC-EDGAR, etc.), etc. that may store various electronic documents, such as, for instance, legal documents (e.g., commercial contracts, lease agreements, public disclosures (e.g., 10k statements, 5k statements, quarterly reports, etc.). The electronic documents stored in these databases may be identified using various identifiers, which may allow location of these documents in the databases, however, contents of electronic documents stored therein might not be parsed and/or specifically identified. For example, a review of the entire electronic document (e.g., 10k statement of a company stored in SEC-EDGAR database) may need to be performed to identify a particular section (e.g., a section related to compensation of executives for the company).

Upon receiving the search query 212 (e.g., as processed for ingestion by the engine 150), the engine 150 may be configured to extract one or more search terms 214 from the query. Using the above example, the search manager engine 150 may extract the following example terms: "lease agreement", "termination", "California". As can be understood, the search terms may include any type of terms and/or combination of terms (e.g., "lease agreement termination").

The search terms 214 may then be passed onto the encoding engine 202 for generation of one or more search vectors 218. The search vectors 218 may be representations of the search terms 214. The search vectors 218 may be generated based on one or more embeddings generated by the encoding engine 202. The embeddings may be generated using one or more encoders (e.g., machine learning models, such as, for example, word2vec, GloVe, BERT for text embeddings, CLIP for image embeddings, Wave2Vec2 for audio embeddings, etc.). The query, which can be a natural language query and/or a multimodal query that may include images, audios, natural language (e.g., text), may be encoded into one or more query embeddings. In some embodiments, the query (and/or query vectors/embeddings) might not and/or does not need to be indexed, and instead, the documents, after being encoded into vectors, may be indexed using various encoding techniques (e.g., KNN, HNSW, IVF, FAISS, etc. encoding methods). The embeddings may include contextualized embeddings, which include a vector representation of one or more words having various contextual information for such words. For example, the embedding may include a word level vector, a sentence level vector, a paragraph level vector, and/or any combination thereof.

In some embodiments, the search terms 214 may be used to generate a knowledge graph storage structure 216 (hereinafter, "knowledge graph"). The knowledge graph generator 204 may be configured to generate the knowledge graph 216. The knowledge graph generator 204 may use the search terms 214, terms contained in one or more electronic documents stored in the source 210, as well as one or more rules 222. The rules may define specific information about the documents, how terms may, are and/or must be connected to other terms within an electronic document and/or across electronic documents.

The rules 222 may be set based on an analysis of electronic documents stored in the source 210. The analysis may involve determination of document type. The types may include, for example a legal document (e.g., a lease agreement, a non-disclosure agreement, a sales agreement, a government contract, a document produced during a legal action, etc.), a non-legal document (e.g., a news article, a book, a journal publication, etc.) and/or any other type. The type may be determined by performing one or more searches of an electronic document using one or more keywords. For instance, determining that the electronic document contains words "lease agreement" (e.g., after a search for "lease agreement") may lead to a conclusion that the electronic document is a legal agreement, and, specifically, a lease agreement. Alternatively, or in addition, each electronic document may include one or more identifiers, metadata, etc. That may indicate specific nature of the electronic document. As can be understood, any other information about the electronic documents stored in the source 210 may be determined.

One or more rules 222 may be determined based on the information about one or more electronic documents in the source 210. For example, a rule 222 may specify that if a document is a lease agreement for a commercial property in the State of California, its term must be a minimum of one year. This rule may also require that clauses in all lease agreements that include a similar termination provision are connected to each other when a knowledge graph is generated.

Upon receiving the search terms 214, the knowledge graph generator 204 may be configured to identify one or more rules 222 based on the received search terms 214. Using the rules 222, it may also conduct a search of the electronic documents in the source 210 to retrieve information specified by the rules. The information may include one or more clauses, paragraphs, sentences, phrases, words, portions, etc. of one or more electronic documents and/or entire electronic documents stored in the source 210. Continuing with the above lease agreement example, 204 may retrieve one or more termination clauses from other lease agreements executed in the State of California, as stored in the source 210. Moreover, using the rules 222, the knowledge graph generator 204 may retrieve clauses of lease agreements stored in the source 210 that are related to specific counties in the State of California where agreements were executed. It may also retrieve other agreements that may be connected to the lease agreements (e.g., confidentiality, non-disclosure agreements, etc.), retrieval of which may be dependent on rules 222 that may define that a specific lease agreement and/or location of execution needs to include such other connected agreements. As can be understood, the current subject matter is not limited to the agreements and/or any rules associated therewith. For example, the current subject may be applicable to any non-legal documents (e.g., books, articles, etc.).

Figure 8:
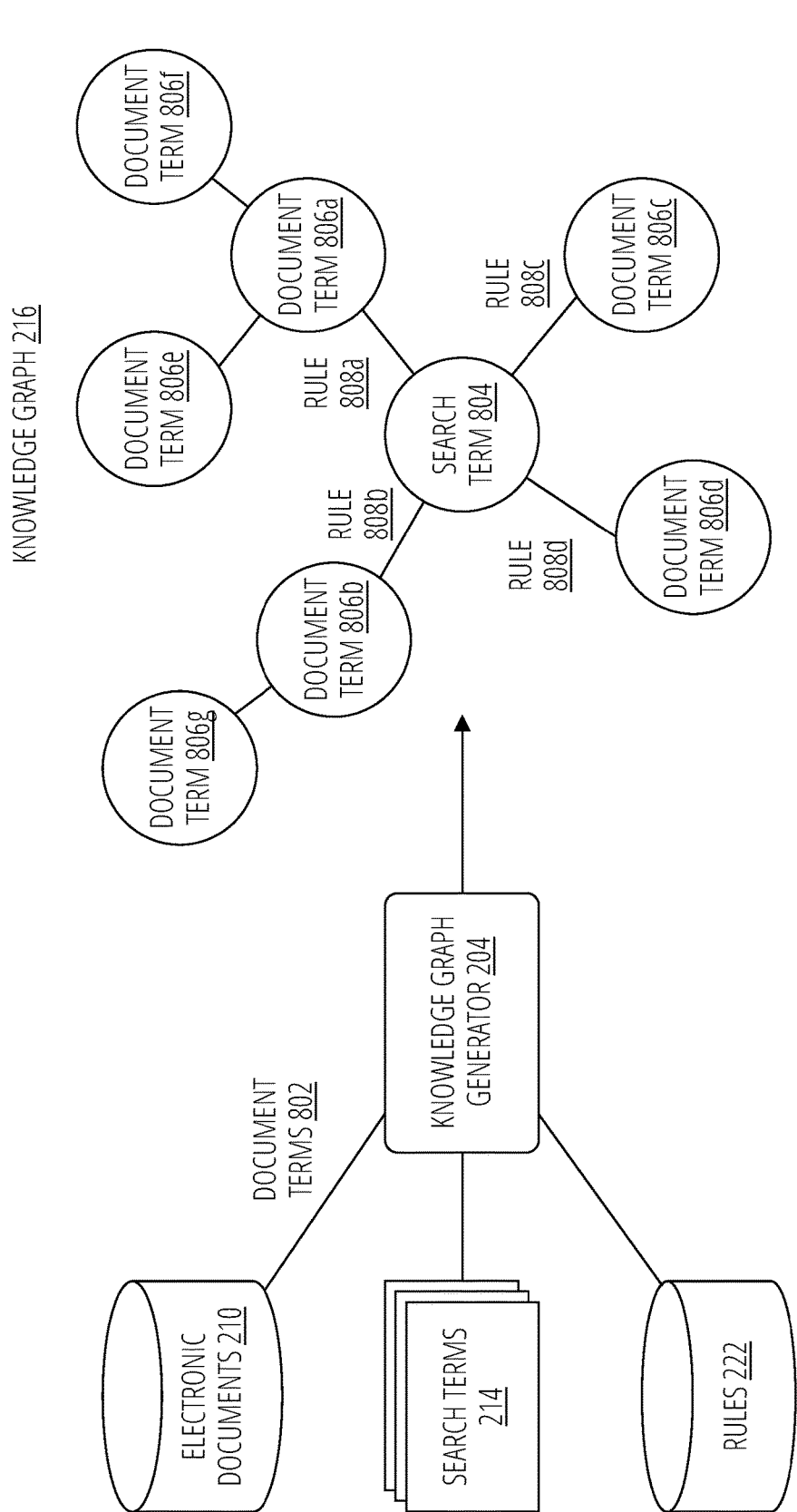
FIG. 8 illustrates an example operation of the knowledge graph generator, according to some embodiments of the current subject matter.

Once the connected terms (e.g., clauses, paragraphs, sentences, phrases, words, etc.) are retrieved, the knowledge graph generator 204 may generate the knowledge graph 216 that connects the search term contained in the search query and the retrieved terms. An example of the knowledge graph 216 is illustrated in FIG. 8.

The terms in the knowledge graph 216 may be used by the modified vector generator 206 to generate one or more modified vectors 220. For example, the terms in the knowledge graph 216 may be used to modify one or more embeddings that were generated by encoding engine 202 in response to receiving the search query 212. The terms in the knowledge graph 216 may likewise be encoded (e.g., by the modified vector generator 206) to generate one or more modified embeddings and/or new embeddings. The modified/new embeddings may be used to generate modified vectors 220.

The modified vectors 220 may be sent to the search execution engine 208 to execute a search on the electronic documents 210. In order to locate responsive electronic documents in the source 210, the search execution engine 208 may generate one or more candidate document vectors that may be matching the modified vector. The engine 208 may then retrieve appropriate responses from the source 210 and provide the results of the search and/or the candidate document vectors to a user via a graphical user interface (GUI) on the client device 112.

Figure 3:
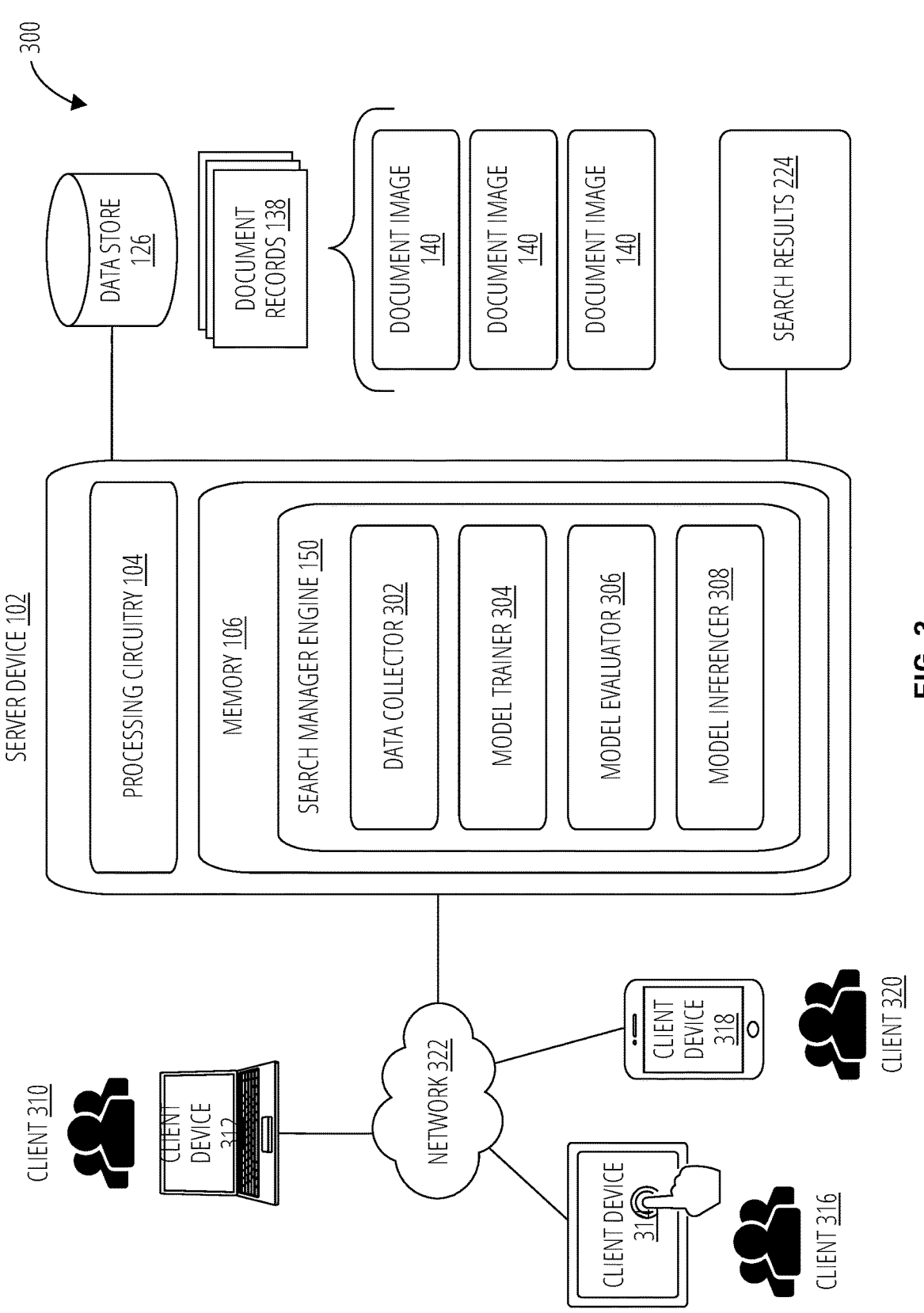
FIG. 3 illustrates an example system, according to some embodiments of the current subject matter.

FIG. 3 illustrates a system 300. The system 300 is similar to the system 100, and further includes different clients such as client 310, client 316 and client 320 using different electronic devices such as client device 312, client device 314 and client device 318, respectively, to communicate with the server device 102 via a network 322. The network 322 may comprise a private network, such as a company intranet, or a public network, such as the Internet and World Wide Web (WWW). The network 322 may be implemented using various wired and wireless technologies and network topologies, such as those suitable for a cloud computing environment, for example.

The server device 102 may implement, among other components, a search manager engine 150. The search manager engine 150 may implement various AI/ML algorithms to implement AI/ML operations for the server device 102, such as in support of operations for the document manager 120, the signature manager 122 and/or the search manager engine 150 of the server device 102 as shown in FIG. 1. The search manager engine 150 may intelligently search and analyze an electronic document 142, such as electronic agreements, using the AI/ML algorithms and models to better understand informational content of the electronic document 142 and generate search results 224. For instance, the search manager engine 150 may uncover information within signed electronic document or unsigned electronic documents.

In particular, the search manager engine 150 may train, evaluate, revise and deploy AI/ML algorithms to assist in receiving and understanding a search query 212 using NLU techniques, semantically searching for relevant information within electronic documents 142 to produce a set of search results 224 for consumption by a human reader. System 300 illustrates an AI/ML infrastructure and environment suitable for deploying AI/ML algorithms to support operations for the search manager engine 150.

As depicted in FIG. 3, the search manager engine 150 may include various software components to support AI/ML techniques, such as a data collector 302, a model trainer 304, a model evaluator 306 and a model inferencer 308. In general, the data collector 302 collects data from one or more document records 138 each comprising one or more document images 140. The document images 140 may include signed electronic documents or unsigned electronic documents. In some cases, the document images 140 may need to be converted between data formats for the data collection phase, such as between a PDF image to a text file, for example. The model trainer 304 receives as input the collected data and processes a portion of the collected data by an AI/ML algorithm to train a ML model. The model evaluator 306 evaluates and improves the trained ML model. The model inferencer 308 implements the trained ML model to receive as input new data, such as a search query 212, and generate one or more search results 224, and output a result such as content from electronic documents 142, links to the content in electronic documents 142 for rapid retrieval and viewing, or other post-solution activity. The search manager engine 150 and underlying components are described in more detail with reference to FIG. 4.

FIG. 4 illustrates an artificial intelligence architecture 400 suitable for use by the search manager engine 150 of the server device 102. The artificial intelligence architecture 400 is an example of a system suitable for implementing various artificial intelligence (AI) techniques and/or machine learning (ML) techniques to perform various document management tasks on behalf of the various devices of the systems 100, 300. AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 400 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 412, evaluate performance of the trained ML model 412, and deploy the tested ML model 412 in a production environment, and continuously monitor and maintain it.

The ML model 412 is a mathematical construct used to predict outcomes based on a set of input data. The ML model 412 is trained using large volumes of training data 428, and it can recognize patterns and trends in the training data 428 to make accurate predictions. The ML model 412 may be derived from an ML algorithm 426 (e.g., a neural network, decision tree, support vector machine, etc.). A data set is fed into the ML algorithm 426 which trains an ML model 412 to "learn" a function that produces mappings between a set of inputs and a set of outputs with a reasonably high accuracy. Given a sufficiently large enough set of inputs and outputs, the ML algorithm 426 finds the function for you. And this function may even be able to produce the correct output for input that it has not seen during training. The programmer (who has now earned the snazzy title of "data scientist") prepares the mappings, selects and tunes the machine learning algorithm, and evaluates the resulting model's performance. Once the model is sufficiently accurate on test data, it can be deployed for production use.

The ML algorithm 426 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 426 of the artificial intelligence architecture 400 may be implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 4, the artificial intelligence architecture 400 includes a set of data sources 402 (e.g., sources 210) to source data 404 for the artificial intelligence architecture 400. Data sources 402 may comprise any device capable generating, processing, storing or managing data 404 suitable for a ML system. Examples of data sources 402 include without limitation databases, web scraping, sensors and Internet of Things (IoT) devices, image and video cameras, audio devices, text generators, publicly available databases, private databases, and many other data sources 402. The data sources 402 may be remote from the artificial intelligence architecture 400 and accessed via a network, local to the artificial intelligence architecture 400 an accessed via a network interface or may be a combination of local and remote data sources 402.

The data sources 402 may source difference types of data 404. For instance, the data 404 may comprise structured data from relational databases, such as customer profiles, transaction histories, or product inventories. The data 404 may comprise unstructured data from websites such as customer reviews, news articles, social media posts, or product specifications. The data 404 may comprise data from temperature sensors, motion detectors, and smart home appliances. The data 404 may comprise image data from medical images, security footage, or satellite images. The data 404 may comprise audio data from speech recognition, music recognition, or call centers. The data 404 may comprise text data from emails, chat logs, customer feedback, news articles or social media posts. The data 404 may comprise publicly available datasets such as those from government agencies, academic institutions, or research organizations. These are just a few examples of the many sources of data that can be used for ML systems. It is important to note that the quality and quantity of the data is critical for the success of a machine learning project. In one embodiment, for example, the data sources 402 may include the document records 138 managed by the system 100.

The data 404 can be in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 402 may be communicatively coupled to a data collector 302. The data collector 302 gathers relevant data 404 from the data sources 402. Once collected, the data collector 302 may use a pre-processor 406 to make the data 404 suitable for analysis. This involves data cleaning, transformation, and feature engineering. For instance, an electronic document 142 may be converted to text information, and the text information may be converted to word vectors. Data preprocessing is a critical step in ML as it directly impacts the accuracy and effectiveness of the model. The pre-processor 406 may receive the data 404 as input, process the data 404, and output pre-processed data 418 for storage in a database 408. The database 408 may comprise a hard drive, solid state storage, and/or random-access memory.

The data collector 302 may be communicatively coupled to a model trainer 304. The model trainer 304 performs AI/ML model training, validation, and testing which may generate model performance metrics as part of the model testing procedure. The model trainer 304 may receive the pre-processed data 418 as input 410 or via the database 408. The model trainer 304 may implement a suitable ML algorithm 426 to train an ML model 412 on a set of training data 428 from the pre-processed data 418. The training process involves feeding the pre-processed data 418 into the ML algorithm 426 to produce or optimize an ML model 412. The training process adjusts its parameters until it achieves an initial level of satisfactory performance.

The model trainer 304 may be communicatively coupled to a model evaluator 306. After an ML model 412 is trained, the ML model 412 needs to be evaluated to assess its performance. This is done using various metrics such as accuracy, precision, recall, and F1 score. The model trainer 304 may output the ML model 412, which is received as input 410 or from the database 408. The model evaluator 306 receives the ML model 412 as input 414, and it initiates an evaluation process to measure performance of the ML model 412. The evaluation process may include providing feedback 420 to the model trainer 304, so that it may re-train the ML model 412 to improve performance in an iterative manner.

The model evaluator 306 may be communicatively coupled to a model inferencer 308. The model inferencer 308 provides AI/ML model inference output (e.g., predictions or decisions). Once the ML model 412 is trained and evaluated, it can be deployed in a production environment where it can be used to make predictions on new data. The model inferencer 308 receives the evaluated ML model 412 as input 416. The model inferencer 308 may use the evaluated ML model 412 to produce insights or predictions on real data, which is deployed as a final production ML model 412. The inference output of the ML model 412 is use case specific. The model inferencer 308 may also perform model monitoring and maintenance, which involves continuously monitoring performance of the search model 1104 in the production environment and making any necessary updates or modifications to maintain its accuracy and effectiveness. The model inferencer 308 may provide feedback 420 to the data collector 302 to train or re-train the ML model 412. The feedback 420 may include model performance feedback information, which may be used for monitoring and improving performance of the ML model 412.

The model inferencer 308 may be implemented by various actors 424 in the artificial intelligence architecture 400, including the search manager engine 150 of the server device 102, for example. The actors 424 may use the deployed ML model 412 on new data to make inferences or predictions for a given task and output an insight 434. The actors 424 may actually implement the model inferencer 308 locally or may remotely receive outputs from the model inferencer 308 in a distributed computing manner. The actors 424 may trigger actions directed to other entities or to itself. The actors 424 may provide feedback 422 to the data collector 302 via the model inferencer 308. The feedback 422 may comprise data needed to derive training data, inference data or to monitor the performance of the ML model 412 and its impact to the network through updating of key performance indicators (KPIs) and performance counters.

As previously described with reference to FIGS. 1, 2, the systems 100, 300 may implement some or all of the artificial intelligence architecture 400 to support various use cases and solutions for various AI/ML tasks suitable for supporting or automating document management operations. In various embodiments, the artificial intelligence architecture 400 may be implemented by the search manager engine 150 of the server device 102 for the systems 100, 300. In one embodiment, for example, the search manager engine 150 may implement the artificial intelligence architecture 400 to train and deploy an ML model 412 as a neural network, as described in more detail with reference to FIG. 5. It may be appreciated that other use cases and solutions for AI/ML are possible as well, and embodiments are not limited in this context.

Figure 5:
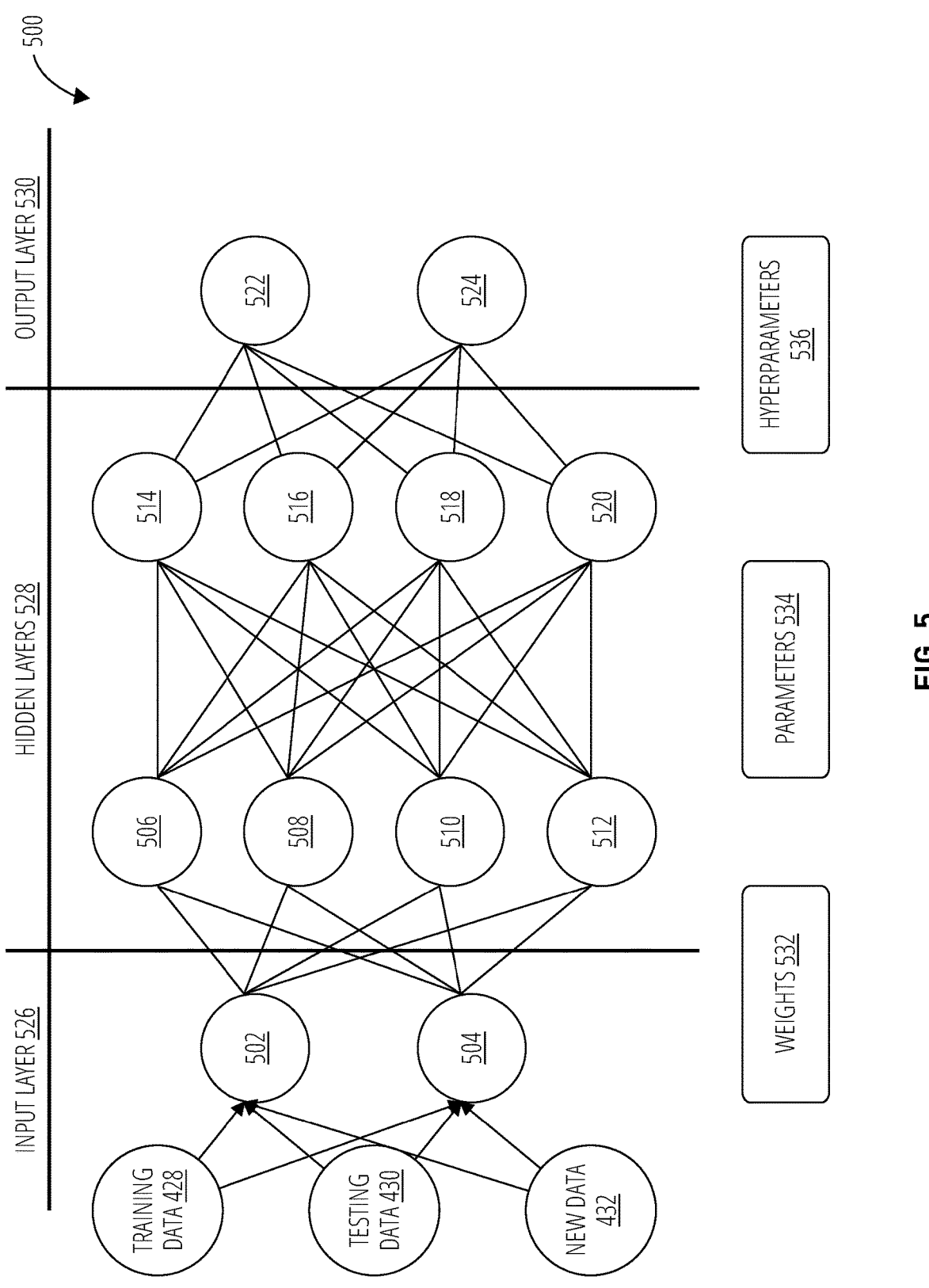
FIG. 5 illustrates an artificial neural network, according to some embodiments of the current subject matter.

FIG. 5 illustrates an embodiment of an artificial neural network 500. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 500 comprises multiple node layers, containing an input layer 526, one or more hidden layers 528, and an output layer 530. Each layer may comprise one or more nodes, such as nodes 502 to 524. As depicted in FIG. 5, for example, the input layer 526 has nodes 502, 504. The artificial neural network 500 has two hidden layers 528, with a first hidden layer having nodes 506, 508, 510 and 512, and a second hidden layer having nodes 514, 516, 518 and 520. The artificial neural network 500 has an output layer 530 with nodes 522, 524. Each node 502 to 424 may comprise a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 500 relies on training data 428 to learn and improve accuracy over time. However, once the artificial neural network 500 is fine-tuned for accuracy, and tested on testing data 430, the artificial neural network 500 is ready to classify and cluster new data 432 at a high velocity. Tasks in speech recognition or image recognition can take minutes versus hours when compared to the manual identification by human experts.

Each individual node 502 to 424 is a linear regression model, composed of input data, weights, a bias (or threshold), and an output. The linear regression model may have a formula similar to Equation (1), as follows:

$$\Sigma w_i x_i + \text{bias} = w1x1 + w2x2 + w3x3 + \text{bias}$$

$$\text{output} = f(x) = l \text{ if } \Sigma w l x l + b^{>} = 0; 0 \text{ if } \Sigma w l x l + b < 0 \qquad \text{EQUATION (1)}$$

Once an input layer 526 is determined, a set of weights 532 are assigned. The weights 532 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 500 as a feedforward network.

In one embodiment, the artificial neural network 500 leverages sigmoid neurons, which are distinguished by having values between 0 and 1. Since the artificial neural network 500 behaves similarly to a decision tree, cascading data from one node to another, having x values between 0 and 1 will reduce the impact of any given change of a single variable on the output of any given node, and subsequently, the output of the artificial neural network 500.

The artificial neural network 500 may have many practical use cases, like image recognition, speech recognition, text recognition or classification. The artificial neural network 500 may leverage supervised learning, or labeled datasets, to train the algorithm. As the model is trained, its accuracy may be measured using a cost (or loss) function. This is also commonly referred to as the mean squared error (MSE). An example of a cost function is shown in Equation (2), as follows:

$$\text{Cost Function} = MSE = \frac{1}{2m}\sum_{j=1}^{m}(\hat{y}_i - y_i)^2 \to \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 534 of the model adjust to gradually converge at the minimum.

In one embodiment, the artificial neural network 500 is feedforward, meaning it flows in one direction only, from input to output. However, the artificial neural network 500 may also be trained through backpropagation; that is, move in the opposite direction from output to input. Backpropagation allows calculation and attribution of errors associated with each neuron 502 to 424, thereby allowing adjustment to fit the parameters 534 of the model(s) appropriately.

The artificial neural network 500 may be implemented as different neural networks depending on a given task. Neural networks can be classified into different types, which are used for different purposes. The artificial neural network 500 may be implemented as a feedforward neural network, or multi-layer perceptrons (MLPs), comprised of an input layer 526, hidden layers 528, and an output layer 530. While these neural networks are also commonly referred to as MLPs, they are actually comprised of sigmoid neurons, not perceptrons, as most real-world problems are nonlinear. Trained data 404 usually is fed into these models to train them, and they are the foundation for computer vision, natural language processing, and other neural networks. The artificial neural network 500 may also be implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. The artificial neural network 500 may further be implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 500 may be implemented as any type of neural network suitable for a given EDMP of system 100, and the MLP, CNN, and RNN are merely a few examples. Embodiments are not limited in this context.

The artificial neural network 500 may have a set of associated parameters 534. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth. The artificial neural network 500 may have other parameters 534 as well. Embodiments are not limited in this context.

In some cases, the artificial neural network 500 may also be implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 536. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters can impact the model learning rate and other regulations during the training process as well as final model performance. A deep learning neural network may use hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 6:
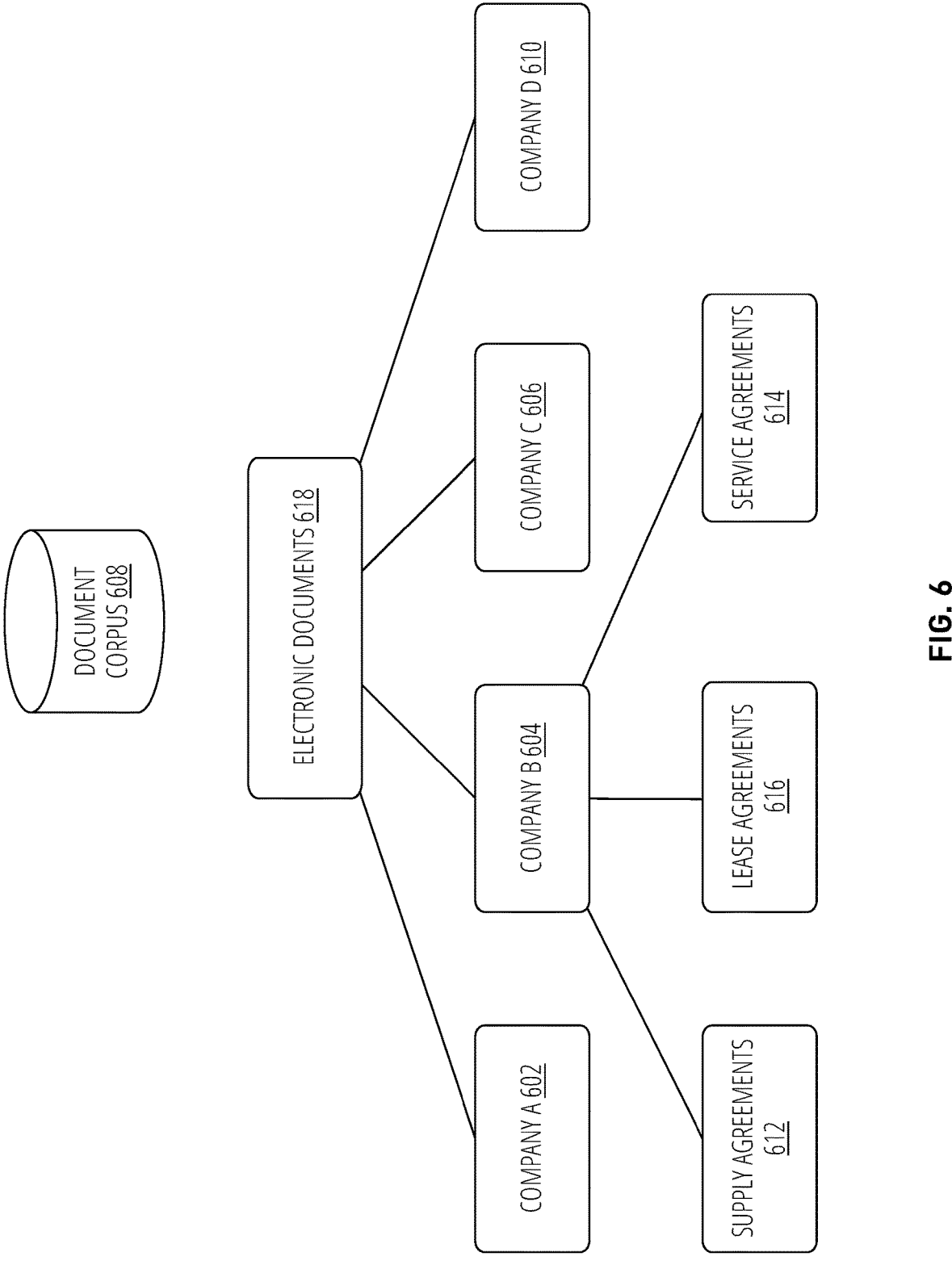
FIG. 6 illustrates a document corpus, according to some embodiments of the current subject matter.

FIG. 6 illustrates an example of a document corpus 608 (which may be stored in the source 210) suitable for use by the search manager engine 150 of the server device 102. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As depicted in FIG. 6, the document corpus 608 may include information from electronic documents 618 derived from the document records 138 stored in the data store 126 (e.g., similar to the source 210). The electronic documents 618 may include any electronic document having metadata such as STME 132 suitable for receiving an electronic signature, including both signed electronic documents or unsigned electronic documents. Different sets of the electronic documents 618 of the document corpus 608 may be associated with different entities. For example, a first set of electronic documents 618 is associated with a company A 602. A second set of electronic documents 618 is associated with a company B 604. A third set of electronic documents 618 is associated with a company C 606. A fourth set of electronic documents 618 is associated with a company D 610. Although some embodiments discuss the document corpus 608 having electronic documents 618, it may be appreciated that the document corpus 608 may have unsigned electronic document as well, which may be mined using the AI/ML techniques described herein. Embodiments are not limited in this context.

Each set of electronic documents 618 associated with a defined entity may include one or more subsets of the electronic documents 618 categorized by document type. For instance, the second set of electronic documents 618 associated with company B 604 may have a first subset of electronic documents 618 with a document type for supply agreements 612, a second subset of electronic documents 618 with a document type for lease agreements 616, and a third subset of electronic documents 618 with a document type for service agreements 614. In one embodiment, the sets and subsets of electronic documents 618 may be identified using labels manually assigned by a human operator, such as metadata added to a document record for a signed electronic document created in a document management system, or feedback from a user of the system 100 or the system 300 during a document generation process. In one embodiment, the sets and subsets of electronic documents 618 may be unlabeled. In such cases, the search manager engine 150 may use the search model 1104 to identify a defined entity or a document type for a defined entity.

Figure 7:
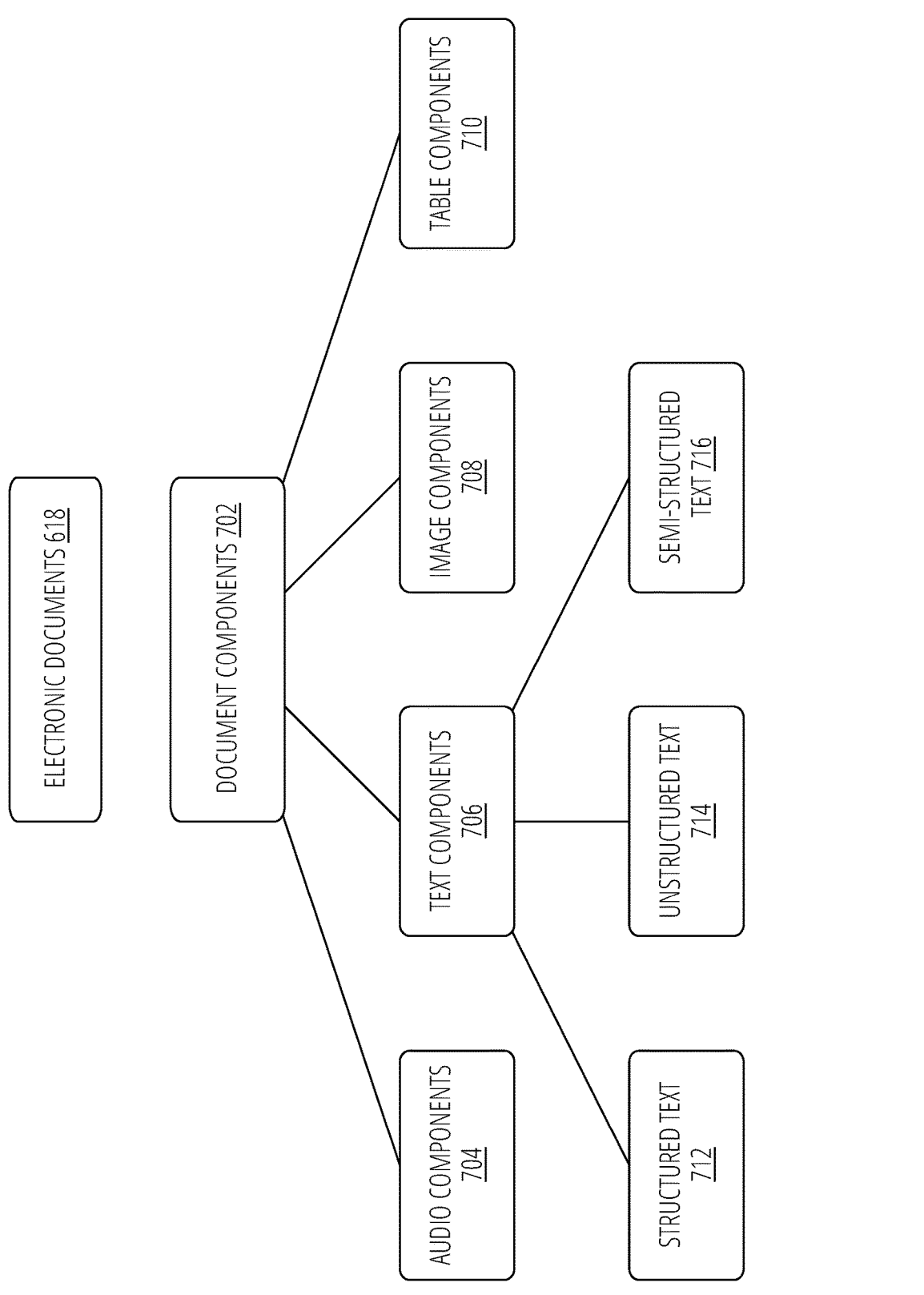
FIG. 7 illustrates electronic documents, according to some embodiments of the current subject matter.

FIG. 7 illustrates an example of an electronic document 618. An electronic document 618 may include different information types that collectively form a set of document components 702 for the electronic document 618. The document components 702 may comprise, for example, one or more audio components 704, text components 706, image components 708, or table components 710. Each document component 702 may comprise different content types. For example, the text components 706 may comprise structured text 712, unstructured text 714, or semi-structured text 716.

Structured text 712 refers to text information that is organized in a specific format or schema, such as words, sentences, paragraphs, sections, clauses, and so forth. Structured text 712 has a well-defined set of rules that dictate how the data should be organized and represented, including the data types and relationships between data elements.

Unstructured text 714 refers to text information that does not have a predefined or organized format or schema. Unlike structured text 712, which is organized in a specific way, unstructured text 714 can take various forms, such as text information stored in a table, spreadsheet, figures, equations, header, footer, filename, metadata, and so forth.

Semi-structured text 716 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

FIG. 8 illustrates an example operation of the knowledge graph generator 204, according to some embodiments of the current subject matter. The knowledge graph generator 204 may be configured to generate one or more knowledge graphs 216 using one or more document terms 802 obtained from one or more electronic documents stored in the source 210, one or more search terms 214 extracted from search query 212, and one or more rules 222. The rules may be defined by one or more electronic documents stored in the source 210, one or more search queries 144, and/or be any other rules that may be defined by third parties.

The document terms 802 may be identified based on the search terms 214. For example, a search term of "termination" in the lease agreement may trigger identification of terms 802 that may include "jurisdiction", "term", etc. The document terms 802 may be ascertained from electronic documents stored in the source 210. Alternatively, or in addition, the document terms 802 may be independent of the search terms 214. For example, the document terms 802 may be identified by a user but not included in the search terms 214.

The rules 222 may be used to identify one or more electronic documents and/or one or more terms 802 of one or more electronic documents stored in the source 210. The rule 222 may specify how search terms 214 and the document terms 802 may need to be connected and/or associated with one another either within a particular electronic document stored in the source 210 and/or across multiple electronic documents stored in the source 210 in the knowledge graph 216. Moreover, the rules 222 may specify how document terms 802 may need to be connected to other document terms 802 within a particular electronic document stored in the source 210 and/or across multiple electronic documents stored in the source 210 in the knowledge graph 216

The knowledge graph generator 204 may be configured to ingest the document terms 802, the search terms 804, and the rules 222 and generate a storage structure, i.e., the knowledge graph 216. An example of the knowledge graph 216 is shown in FIG. 8. It may include a search term 804 (e.g., one of the search terms 214) that may be connected or associated with document terms 806a, 806b, 806c, and 806d. The connection between the search term 804 and document terms 806 (a, b, c, d) may be defined by respective rules 808 (as derived from rules 222). For example, rule 808a may define connection between search term 804 and document term 806a (e.g., "lease agreement" and "commercial"); rule 808b may define connection between search term 804 and document term 806b (e.g., "lease agreement" and "State of California"); rule 808c may define connection between search term 804 and document term 806c (e.g., "lease agreement" and "term"); and rule 808d may define connection between search term 804 and document term 806d (e.g., "lease agreement" and "confidentiality"). Some document terms may also be connected to other document terms in accordance with one or more rules. For example, document term 806b may be connected to document term 806g (e.g., "State of California" and "San Francisco") using a rule from rules 222, and 806a may be connected to document term 806e and document term 806f (e.g., "commercial" and "square footage" and "property insurance") using rules identified from rules 222. As can be understood, the knowledge graph 216 may be generated by knowledge graph generator 204 in any desired way and may have any structure that may be suitable for enhancing search vectors 218 generated by the encoding engine 202.

In some embodiments, the knowledge graph generator 204 may be configured to encode one or more or each of the terms and/or connections formed between the terms into one or more embeddings so that vectors representing the terms and/or connections may be then formed. The formed vectors may be used to modify the search vectors 218 that may be generated by the encoding engine 202.

Figure 9:
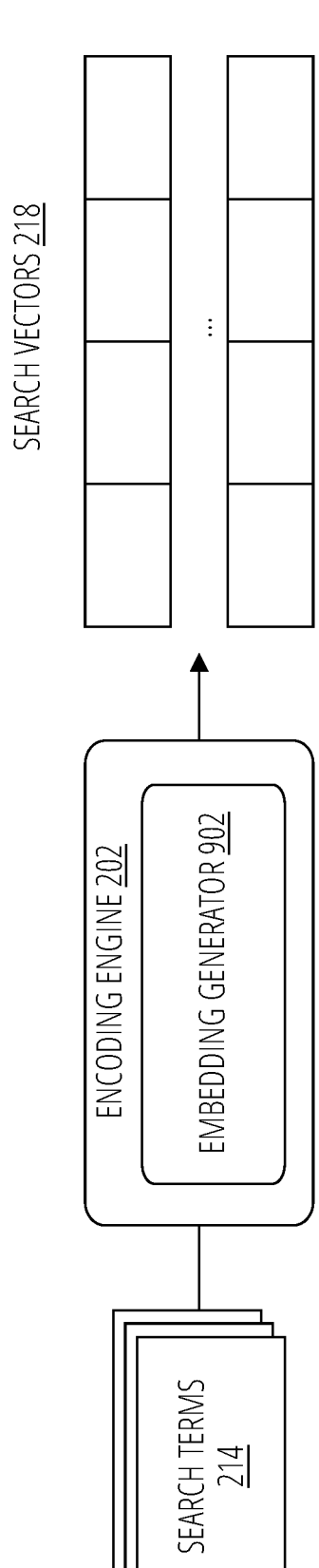
FIG. 9 illustrates an example operation of the encoding engine, according to some embodiments of the current subject matter.

FIG. 9 illustrates an example operation of the encoding engine 202, according to some embodiments of the current subject matter. The encoding engine 202 may be configured to generate one or more search vectors 218. In particular, the encoding engine 202 may include an embedding generator 902 that may be configured to generate one or more embeddings based on one or more search terms 214 (e.g., search term 804) that may be extracted from the search query 212 received from one or more client devices 112.

The encoding engine 202 may for example include one or more encoders (e.g., machine learning models, such as, for example, word2vec, GloVe, BERT for text embeddings, CLIP for image embeddings, Wave2Vec2 for audio embeddings, etc.) that may be used to generate one or more embeddings. The query, which can be a natural language query and/or a multimodal query that may include images, audios, natural language (e.g., text), may be encoded into one or more query embeddings. In some embodiments, the query (and/or query vectors/embeddings) might not and/or does not need to be indexed, and instead, the documents, after being encoded into vectors, may be indexed using various encoding techniques (e.g., KNN, HNSW, IVF, FAISS, etc. encoding methods). The embeddings may include contextualized embeddings, which may include a vector representation of one or more words having various contextual information for such words, as discussed herein. For example, the embedding may include a word level vector, a sentence level vector, a paragraph level vector, and/or any combination thereof.

The embeddings generated by the embedding generator 902 may be used to form one or more search vectors 218. The search vectors 218 may be used to search one or more electronic documents stored in the source 210. In some embodiments, the search vectors 218 may be modified by the modified vector generator 206 using the knowledge graph 216 into modified vectors 220. The search vectors 218 and/or modified vectors 220 may be used by the search execution engine 208 to search the electronic documents stored in the source 210 to retrieve information (using one or more responsive candidate vectors) in response to the search query 212. The retrieved information may include clauses, phrases, sentences, words, and/or any other portions of electronic documents stored in the source 210.

Figure 10:
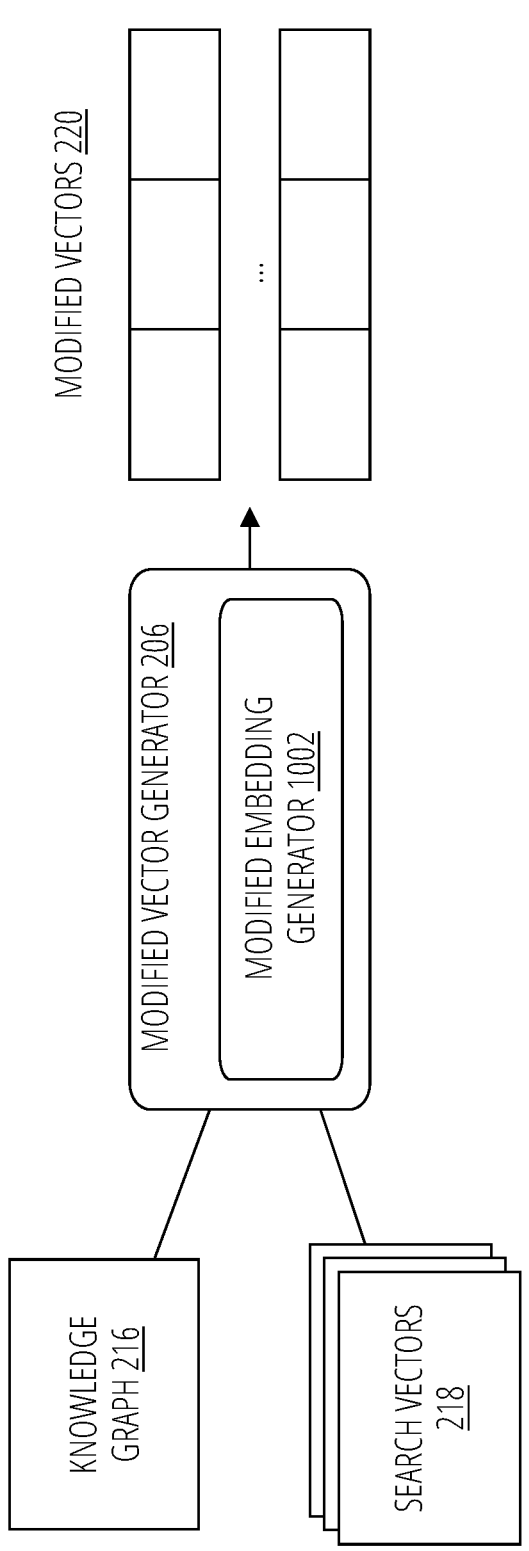
FIG. 10 illustrates an example operation of the modified vector generator, according to some embodiments of the current subject matter.

FIG. 10 illustrates an example operation of the modified vector generator 206, according to some embodiments of the current subject matter. The modified vector generator 206 may be configured to generate one or more modified vectors 220. Specifically, the modified vector generator 206 may include a modified embedding generator 1002 that may be configured to generate one or more modified embeddings based on one or more search vectors 218 and the knowledge graph 216.

The modified vector generator 206, similar, to encoding engine 202, may include one or more encoders (e.g., machine learning models, such as, for example, word2vec, GloVe, BERT for text embeddings, CLIP for image embeddings, Wave2Vec2 for audio embeddings, etc.) that may be used to generate one or more modified embeddings. The query, which can be a natural language query and/or a multimodal query that may include images, audios, natural language (e.g., text), may be encoded into one or more query embeddings. In some embodiments, the query (and/or query vectors/embeddings) might not and/or does not need to be indexed, and instead, the documents, after being encoded into vectors, may be indexed using various encoding techniques (e.g., KNN, HNSW, IVF, FAISS, etc. encoding methods). The modified embeddings may include also contextualized embeddings (e.g., a word level vector, a sentence level vector, a paragraph level vector, and/or any combination thereof).

The modified embeddings generated by the modified embedding generator 1002 may be used to form one or more modified vectors 220. The modified vectors 220 may be used to search one or more electronic documents stored in the source 210. In particular, the modified vectors 220 may be sent to the search execution engine 208 to execute a search on the electronic documents stored in the source 210 and to retrieve information in response to the search query 212 (e.g., by retrieving one or more responsive candidate vectors). The retrieved information and/or responsive document vectors may be displayed on a GUI of the client devices 112 (as shown in FIG. 1).

Figure 11:
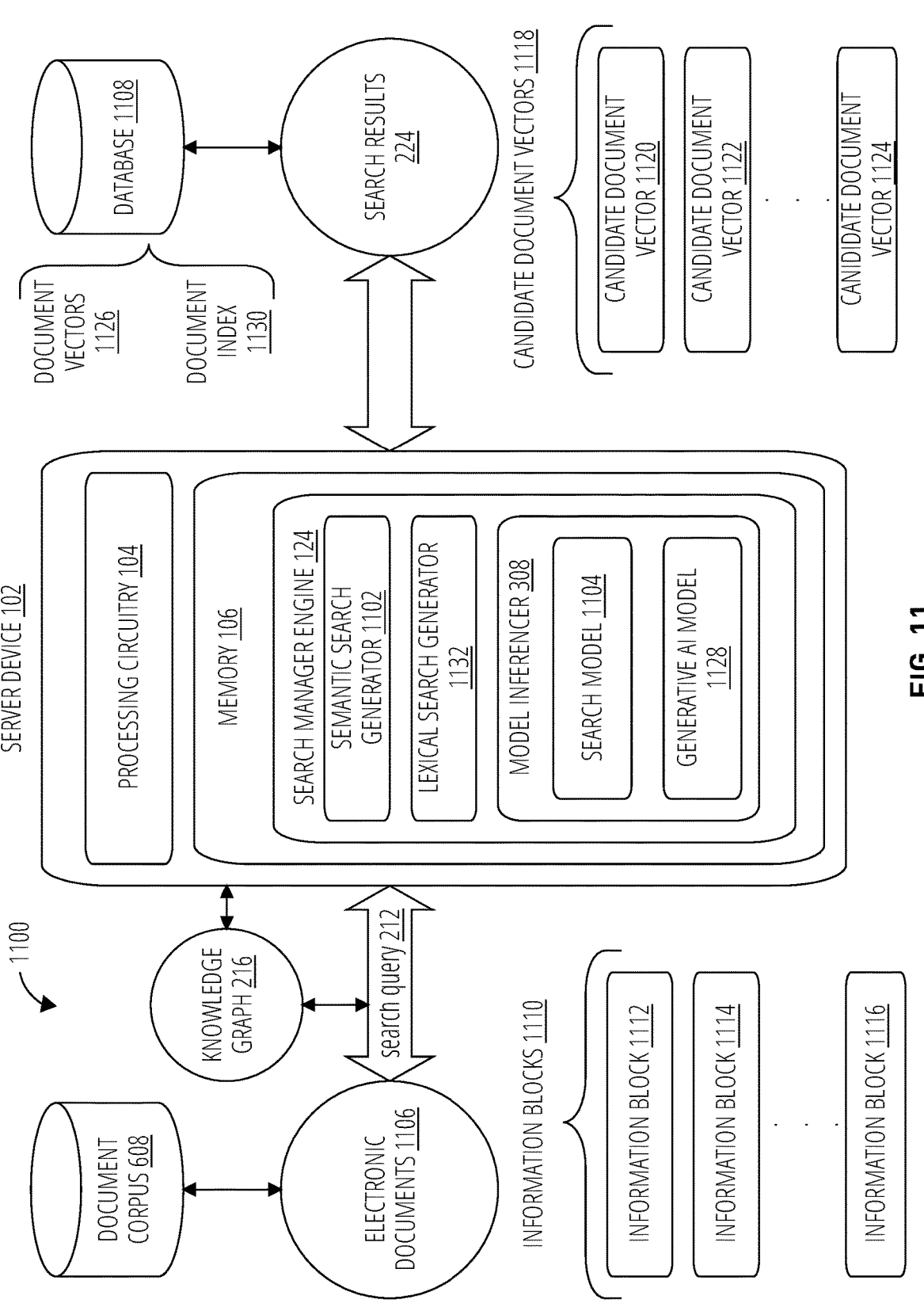
FIG. 11 illustrates an apparatus, according to some embodiments of the current subject matter.

FIG. 11 illustrates an apparatus 1100. The apparatus 1100 may comprise an example implementation for the server device 102. The server device 102 may have access to a collection of electronic documents from a document corpus 608, including a representative electronic documents 1106. The server device 102 may also have access to a set of document vectors 1126 stored in a database 1108. The document vectors 1126 may be contextualized embeddings of document content from the collection of electronic documents of the document corpus 608, such as the electronic documents 1106, for example. The document vectors 1126 may be indexed (e.g., e.g., using one or more known vector indexing algorithms and libraries, such as, for example, k-nearest neighbor (KNN), hierarchical navigable small world (HNSW), k-means, and Inverted File (IVF), FAISS, etc.) and stored as a document index 1130 to facilitate search and retrieval operations.

In some cases, the document vectors 1126 may include or make reference to text components 706 for an electronic documents 1106. Alternatively, the text components 706 may be encoded into a different format other than a vector, such as text strings, for example. This may allow formation of a search index suitable for lexical searching, such as by lexical search generator 1132.

The document corpus 608 may store one or more electronic documents, such as an electronic documents 1106. Examples for the electronic documents 1106 may include document images 140, signed electronic documents 142 or unsigned electronic documents stored in the form of document records 138. In some embodiments, the document corpus 608 may be proprietary and confidential in nature and associated with a particular defined entity, such as an individual, a business, a business unit, a company, an organization, an enterprise, or other defined legal or business structure.

The server device 102 may implement a search manager engine 150. The search manager engine 150 may implement a set of improved search tools and algorithms to perform lexical searching, semantic searching, or a combination of both. In one embodiment, for example, the search manager engine 150 may implement a semantic search generator 1102 to perform semantic searches for a user. In one embodiment, for example, the search manager engine 150 may optionally implement a lexical search generator 1132 to perform lexical searches for a user. The search manager engine 150 may use the lexical search generator 1132 to perform lexical searching in response to the search query 212. The search manager engine 150 may use the semantic search generator 1102 to perform semantic searching in response to the search query 212. In some embodiments, the search manager engine 150 may use the lexical search generator 1132 to generate a first set of lexical search results 224, and the semantic search generator 1102 to iterate over the first set of lexical search results 224 to generate a second set of semantic search results 224. Embodiments are not limited in this context.

As depicted in FIG. 11, the search manager engine 150 may implement a model inferencer 308, as described with reference to FIG. 4, locally as part of the server device 102. Additionally, or alternatively, the model inferencer 308 may be implemented on a device separate from the server device 102. In the latter case, the search manager engine 150 may access inferencing services provided by the model inferencer 308 remotely via a network or a set of application program interfaces (APIs).

The model inferencer 308 may implement various machine learning models trained and managed in accordance with the artificial intelligence architecture 400, such as ML model 412, for example. In one embodiment, the ML model 412 may comprise a search model 1104 trained to transform document content contained within an electronic documents 1106 into semantically searchable document content. For example, the search model 1104 may implement an artificial neural network 500, such as a recurrent neural network (RNN) for an Embeddings from Language Models (ELMo), Bidirectional Encoder Representations from Transformers (BERT), a BERT variant, and so forth. In one embodiment, the ML model 412 may comprise a generative AI model 1128 to implement generative AI techniques to assist in summarizing some or all of the search results in a natural language such as a human language for better readability and understanding by a human reader. For example, the generative AI model 1128 may implement a language model such as a generative pre-trained transformer (GPT) language model, among others. It may be appreciated that the model inferencer 308 may implement other types of ML models 412 to support search operations as desired for a given set of design constraints, such as search speed, size of data sets, number of electronic documents, compute resources, memory resources, network resources, device resources, and so forth. Embodiments are not limited in this context.

The search manager engine 150 may use the ML models of the model inferencer 308 to perform AI/ML inferencing operations in an offline phase and/or an online phase. The search manager engine 150 may encode or transform a set of electronic documents 1106 to create a set of contextualized embeddings (e.g., sentence embeddings) representative of information or document content contained within each electronic documents 1106. The search manager engine 150 may also perform query enhancement and information retrieval operations on the contextualized embeddings for each electronic documents 1106. For instance, the search manager engine 150 may receive a search query 212, encode it to a contextualized embedding in real-time, and leverage vector search to retrieve search results 224 with semantically similar document content within electronic documents 1106. The search manager engine 150 may prepare a prompt with both the search query 212 and some or all of the search results 224 (e.g., the top k sections) from the electronic documents 1106. The server device 102 may surface the search results 224 in a graphical user interface (GUI) of a client device, such as client devices 112 or client devices 116.

In some embodiments, the search manager engine 150 may encode a set of electronic documents 1106 to create a set of contextualized embeddings (e.g., sentence embeddings) for document content contained within each electronic documents 1106. A contextualized embedding refers to a type of word representation in natural language processing that takes into account the context in which a word appears. Unlike traditional static word embeddings, which represent each word with a fixed vector, contextualized embeddings vary depending on the specific context in which the word is used. Contextualized embeddings are typically generated by training deep neural networks, such as recurrent neural networks (RNNs) or transformers, on large amounts of text data. These models learn to produce a unique embedding for each occurrence of a word in a sentence, taking into account the surrounding words and the overall meaning of the sentence. Contextualized embeddings have proven to be highly effective in a wide range of natural language processing tasks, including text classification, question answering, and machine translation, among others. Popular examples of contextualized embeddings include Embeddings from Language Models (ELMo), Bidirectional Encoder Representations from Transformers (BERT), a generative pre-trained transformer (GPT) language model, transformer-XL, among others.

A general example illustrates the concept of contextualized embeddings. Consider the word "bank", which can have multiple meanings depending on the context. In the sentence "I deposited my paycheck at the bank", the word "bank" refers to a financial institution. But in the sentence "I went for a walk along the bank of the river", the word "bank" refers to the edge of a body of water. A contextualized embedding would take into account the different meanings of "bank" in these two sentences and produce different embeddings for each occurrence of the word. This would allow downstream natural language processing models to better understand the meaning of the word in context and make more accurate predictions.

A format of a contextualized embedding depends on the specific model used to generate it. In general, contextualized embeddings are represented as high-dimensional vectors of real numbers, where each dimension corresponds to a particular feature or aspect of the word's context. For example, the Embeddings from Language Models (ELMo) model generates contextualized embeddings as a concatenation of the output from multiple layers of a bidirectional Long Short-Term Memory (LSTM) network. Each LSTM layer captures information about the word's context at a different level of granularity, and the final contextualized embedding is a weighted combination of the embeddings from all the layers. On the other hand, Bidirectional Encoder Representations from Transformers (BERT) generates contextualized embeddings using a multi-layer transformer network. In this case, the contextualized embedding for a word is a fixed-length vector that represents the entire sequence of words in the input sentence, with the specific position of the word encoded as a positional embedding. The exact format of a contextualized embedding can also vary depending on the specific downstream task for which it is being used. For example, a classification model may take the entire contextualized embedding as input, while a sequence labeling model may use only a subset of the dimensions corresponding to the specific position of the word in the input sequence.

In some embodiments, the model is fine-tuned to support search tasks performed by the search manager engine 150, such as encoding a set of electronic documents 508. The model may be trained on the electronic documents 508 stored in the document corpus 608, which may be specifically associated with a defined entity, such as a customer or client of the system 100 or system 300. Consequently, the search model 1104 and the generative AI model 1128 are trained on confidential and proprietary information associated with a defined entity in order to perform custom and highly specialized inferencing operations and tasks for the defined entity.

The search model 1104 may implement an encoder to encode a sequence of sentences within a document or an entire document. However, the encoder encodes each token (e.g., a word or subword) in the input sequence independently and produces a separate contextualized embedding for each token. Therefore, to encode an entire document or a sequence of sentences within a document, the search model 1104 needs to aggregate the embeddings of individual tokens in a meaningful way. One way to aggregate the embeddings is to take the mean or the maximum of the embeddings across all tokens in the sequence. This can be useful for tasks such as document content classification or sentiment analysis, where the search model 1104 assigns a label or score to a portion of a document or the entire document based on its content. Another way to aggregate the embeddings is to use an attention mechanism to weight the importance of each token based on its relevance to the task at hand. This can be useful for tasks such as question answering or summarization, where the search model 1104 is tuned to focus on the most informative parts of the input sequence. There are also more sophisticated ways to aggregate the embeddings, such as hierarchical pooling or recurrent neural networks, that take into account the structure of the document or sequence. The specific aggregation method depends on the task and the characteristics of the input data and may require some experimentation to find the most effective approach. Embodiments are not limited in this context.

In some embodiments, the search manager engine 150 may encode a set of electronic documents 1106 to create a set of contextualized embeddings (e.g., sentence embeddings) for information or document content contained within each electronic documents 1106. As depicted in FIG. 11, electronic documents 1106 may include a set of N information blocks 1110, where Nis any positive integer. FIG. 11 depicts an example set of N information blocks 1110 that includes an information block 1112, an information block 1114 and an information block 1116 (i.e., N=3). Each of the information blocks 1110 may include a defined amount of textual information of any feature size suitable for a given token, such as an n-gram, a word, a sentence, a phrase, a paragraph, a section, and so forth. It may be appreciated that N=3 is by way of example and not limitation. The search manager engine 150 may use the search model 1104 to encode the information blocks 1110 into corresponding contextualized embeddings depicted as a set of M document vectors 1126, where M represents any positive integer.

The search manager engine 150 may store the document vectors 1126 in a database 1108 and index the document vectors 1126 into a searchable document index 1130. The document index 1130 allows for rapid retrieval of relevant document vectors 1126 by the search manager engine 150 during the online search phase. The document index 1130 may include any data structure that stores these embeddings in a way that allows for efficient retrieval. For example, the document index 1130 may be implemented as a hash table or a tree structure to index the embeddings by the words or phrases they represent.

The search manager engine 150 may further receive a search query 212, encode it to a contextualized embedding in real-time, enhance it with knowledge obtained from term-centric (e.g., based on search term 804) generated knowledge graph 216 and leverage vector search to retrieve search results 224 with semantically similar document content within an electronic documents 1106. The search query 212 may include any free form text in a natural language representation of a human language. The search manager engine 150 may use the search model 1104 to generate a contextualized embedding for the search query 212 to form a search vector. As previously discussed, a contextualized embedding may include a vector representation of a sequence of words in the search query 212 that includes contextual information for the sequence of words.

As discussed herein, the search query 212 may be modified or expanded using knowledge graph 216. The knowledge graph 216 may be any storage structure that may include information generated based on the search terms (e.g., search term 804). In some example embodiments, the any enhanced or modified queries may include any previous search queries 212, prior search results 224 from a previous search query 212. The knowledge graph 216 may include metadata for the electronic documents 1106 (e.g., signatures, STME, marker elements, document length, document type, etc.), rules defining connections in the knowledge graph, and/or any other context information that may be suitable for further refining the search query 212.

The search manager engine 150 may search a document index 1130 of contextualized embeddings for the electronic documents 1106 with the search vector, which is itself a contextualized embedding of the same type as those stored in the document index 1130. Each contextualized embedding may include a vector representation of a sequence of words in the electronic document that includes contextual information for the sequence of words. The search process may produce a set of search results 224. The search results 224 may include a set of P candidate document vectors 1118, where P is any positive integer. The search results 224 may include candidate document vectors 1118 that are semantically similar to the search vector of the search query 212 and/or search query 212 that has been enhanced using knowledge from the knowledge graph 216. FIG. 11 depicts an example set of P candidate document vectors 1118 that includes a candidate document vector 1120, a candidate document vector 1122 and a candidate document vector 1124 (i.e., P=3). It may be appreciated that P=3 is by way of example and not limitation.

In some embodiments, as with the document vectors 1126, the candidate document vectors 1118 may include or make reference to text components 706 for an electronic documents 1106. Alternatively, the text components 706 may be encoded into a different format other than a vector, such as text strings, for example.

More particularly, to search for content within an electronic documents 1106 using contextualized embeddings, the search manager engine 150 uses the search model 1104 to encode the electronic documents 1106 during the offline phase. The search model 1104 implements an encoder to generate a sequence of contextualized embeddings, one for each token in the electronic documents 1106. In some embodiments, for example, the search model 1104 may generate sentence-level contextualized embeddings. Similarly, the search manager engine 150 may use the search model 1104 to encode a search query 212 using the encoding engine 202 to generate a contextualized embedding for the search query 212 in a manner similar to generating the document vectors of the electronic documents 1106. The search model 1104 can then aggregate the embeddings of the document tokens using an attention mechanism to weight the importance of each token based on its relevance to the query.

Alternatively, or in addition, the search model 1104 can use a pre-built search engine or information retrieval system that leverages contextualized embeddings to perform content-based search within a document. These systems typically use more advanced techniques for encoding, aggregating, and ranking embeddings to optimize search performance and accuracy.

One example of a pre-built search engine that uses contextualized embeddings for content-based search is Elasticsearch. Elasticsearch is an open-source search engine that provides a distributed, scalable, and efficient search and analytics platform. It uses the concept of inverted indices to enable fast full-text search and supports a wide range of search queries and aggregations. Elasticsearch also provides a plugin called Elasticsearch Vector Scoring, which enables the use of dense vector embeddings for similarity search. This plugin can be used to index and search documents based on their dense vector embeddings, which can be generated using BERT or other contextualized embedding models. To use Elasticsearch for content-based search with dense vectors, the search model 1104 indexes the documents and their embeddings using the Elasticsearch Vector Scoring plugin. The search manager engine 150 can then search for similar documents by specifying a query embedding and using the cosine similarity as the similarity metric. Elasticsearch will return the top matching documents based on their similarity scores. Elasticsearch also provides various options for customizing the indexing, searching, and scoring of the embeddings, as well as integrating with other natural language processing tools and frameworks.

Another example of a pre-built engine that uses contextualized embeddings for content-based search is Azure Cognitive Search made by Microsoft® Corporation. Azure Cognitive Search utilizes semantic search, which is a collection of query-related capabilities that bring semantic relevance and language understanding to search results. Semantic search is a collection of features that improve the quality of search results. When enabled by the search manager engine 150, such as a cloud search service, semantic search extends the query execution pipeline in two ways. First, it adds secondary ranking over an initial result set, promoting the most semantically relevant results to the top of the list. For instance, the search manager engine 150 may use the lexical search generator 1132 to perform a lexical full-text search to produce and rank a first set of search results 224. The search manager engine 150 may then use the semantic search generator 1102 to perform a semantic search that does a semantic re-ranking, which uses the context or semantic meaning of a search query 212 to compute a new relevance score over the first set of search results 224. Second, it extracts and returns captions and answers in the response, which the search manager engine 150 can render on a search page to improve user search experience. The semantic search generator 1102 extracts sentences and phrases from an electronic documents 1106 that best summarize the content, with highlights over key passages for easy scanning. Captions that summarize a result are useful when individual content fields are too dense for the results page. Highlighted text can be used to elevate the most relevant terms and phrases so that users can quickly determine why a match was considered relevant. The semantic search generator 1102 may also provide semantic answers, which is an optional and additional substructure returned from a semantic query. It provides a direct answer to a query that looks like a question.

In some embodiments, the semantic search generator 1102 may implement Azure Cognitive Search to perform semantic searching and perform semantic ranking. Semantic ranking looks for context and relatedness among terms, elevating matches that make more sense given the search query 212. Language understanding finds summarizations or captions and answers within document content and includes them in the response, which can then be rendered on a search results page for a more productive search experience. Pre-trained models are used for summarization and ranking. To maintain the fast performance that users expect from search, semantic summarization and ranking are applied to a set number of results, such as the top 50 results, as scored by the default scoring algorithm. Using those results as the document corpus, semantic ranking re-scores those results based on the semantic strength of the match.

The semantic search generator 1102 may use a particular order of operations. Components of the semantic search generator 1102 extend the existing query execution pipeline in both directions. If the search model 1104 enables spelling correction, the speller corrects typos at query onset, before terms reach the search engine. Query execution proceeds as usual, with term parsing, analysis, and scans over the inverted indexes. The search model 1104 retrieves documents using token matching and scores the results using a default scoring algorithm. Scores are calculated based on the degree of linguistic similarity between query terms and matching terms in the index. If defined, scoring profiles are also applied at this stage. Results are then passed to the semantic search subsystem.

In the preparation step, the document corpus returned from the initial result set is analyzed at the sentence and paragraph level to find passages that summarize each document. In contrast with keyword search, this step uses machine reading and comprehension to evaluate the content. Through this stage of content processing, a semantic query returns captions and answers. To formulate them, semantic search uses language representation to extract and highlight key passages that best summarize a result. If the search query is a question—and answers are requested—the response will also include a text passage that best answers the question, as expressed by the search query. For both captions and answers, existing text is used in the formulation. The semantic models typically do not compose new sentences or phrases from the available content, nor does it apply logic to arrive at new conclusions. In one embodiment, the system does not return content that does not already exist. Results are then re-scored based on the conceptual similarity of query terms. To use semantic capabilities in queries, the search model 1104 may optionally need to make small modifications to the search query 212, such as adding an information field with a parameter indicating a type of search, such as "lexical" or "semantic". However, no extra configuration or reindexing is typically required.

Figure 12:
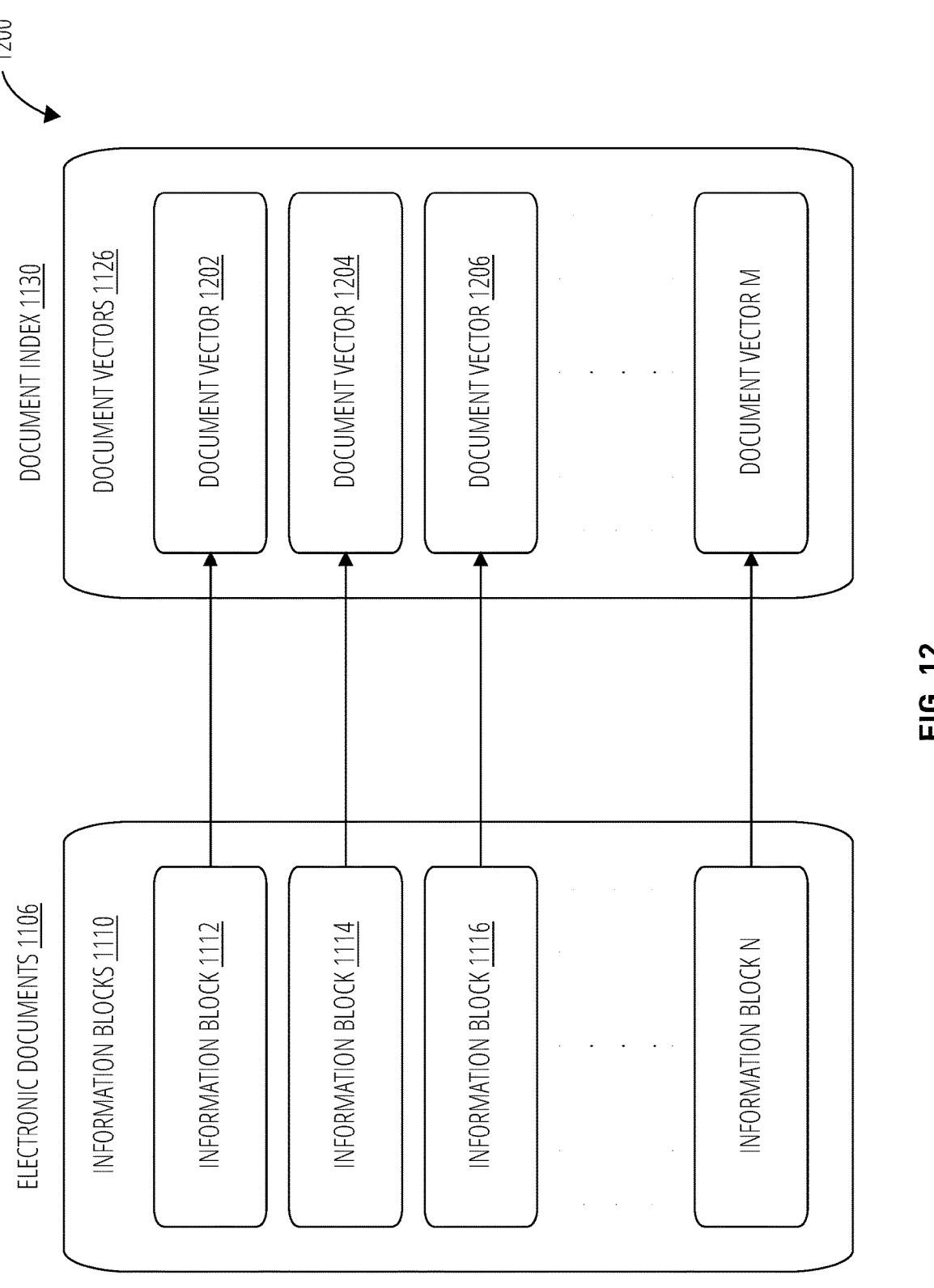
FIG. 12 illustrates an operating environment, according to some embodiments of the current subject matter.

FIG. 12 illustrates an operating environment 1200. The operating environment 1200 illustrates an example of encoding an electronic documents 1106 into a set of document vectors 1126.

As previously discussed, the search manager engine 150 may encode a set of electronic documents 1106 to create a set of contextualized embeddings (e.g., sentence embeddings) for information or document content contained within each electronic documents 1106. As depicted in FIG. 12, an electronic documents 1106 may comprise a set of N information blocks 1110, where Nis any positive integer. FIG. 11 depicts an example set of N information blocks 1110 that includes an information block 1112, an information block 1114 and an information block 1116 (i.e., N=3). Each of the information blocks 1110 may comprise a defined amount of textual information of any feature size suitable for a given token, such as an n-gram, a word, a sentence, a phrase, a paragraph, a section, and so forth. It may be appreciated that N=3 is by way of example and not limitation.

The search manager engine 150 may use the search model 1104 to encode the information blocks 1110 into corresponding contextualized embeddings depicted as a set of M document vectors 1126, where M represents any positive integer. As depicted in FIG. 12, the search manager engine 150 may use the search model 1104 to encode the information block 1112 into a document vector 1202, the information block 1114 into a document vector 1204, the information block 1116 into the document vector 1206, and the information block N into the document vector M.

One or more of the information blocks 1110 and/or the document vectors 1126 may optionally include block labels assigned using a machine learning model, such as a classifier. A block label may represent a type or content type for information or data contained within each of the information blocks 1110, such as a semantic meaning, a standard clause, a provision, customer data, buyer information, seller information, product information, service information, licensing information, financial information, cost information, revenue information, profit information, sales information, purchase information, accounting information, milestone information, representations and warranties information, term limits, choice of controlling law, legal clauses, or any other information that is contained within an electronic document and useful for a given entity. Embodiments are not limited in this context.

Figure 13:
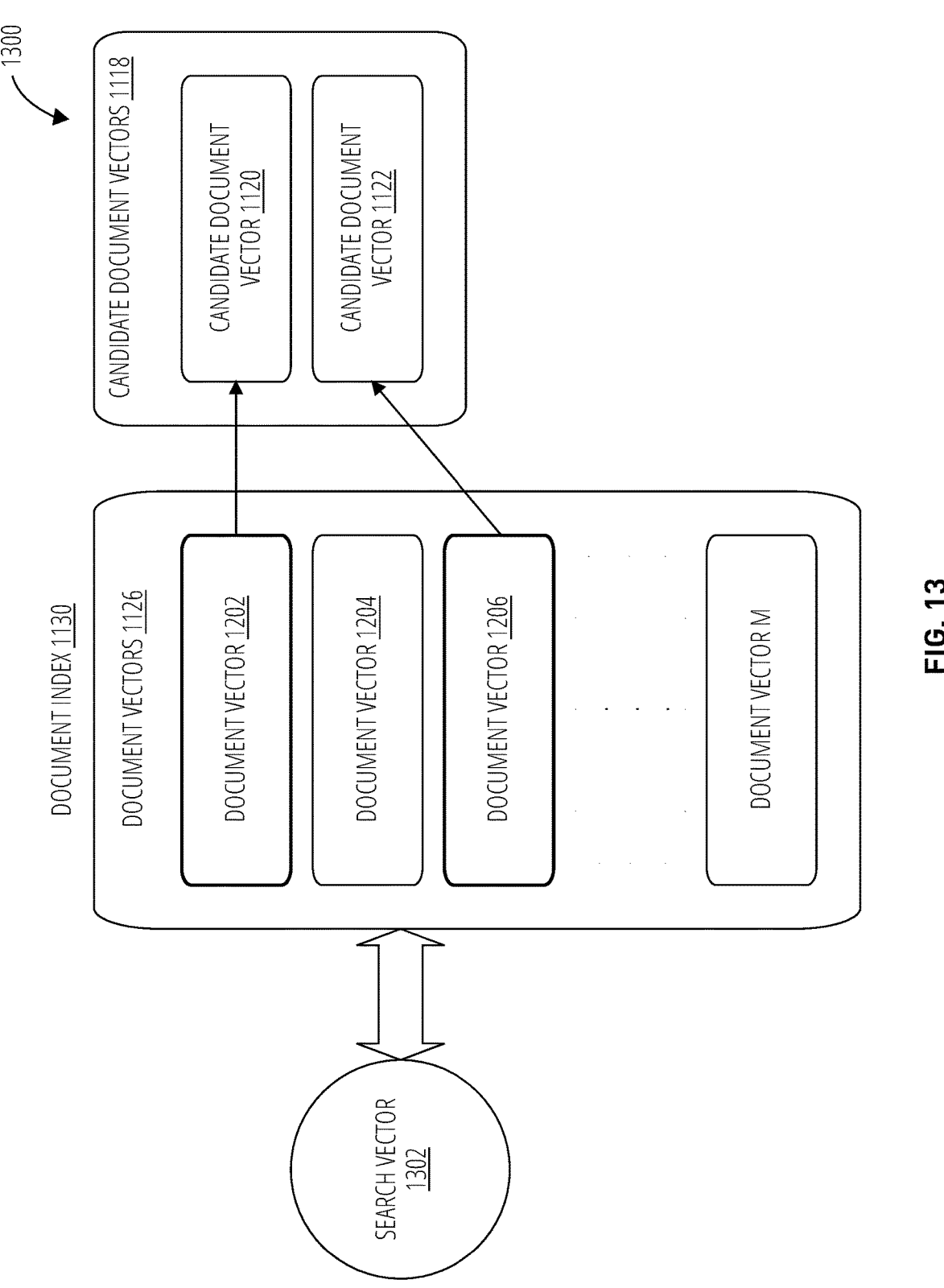
FIG. 13 illustrates an operating environment, according to some embodiments of the current subject matter.

FIG. 13 illustrates an operating environment 1300. The operating environment 1300 illustrates an example of the search manager engine 150 performing a semantic search of the document vectors 1126 to find a set of candidate document vectors 1118 relevant to the search query 212.

As previously discussed, the search manager engine 150 may receive a search query 212, encode it to a contextualized embedding in real-time, enhance the query with knowledge from the knowledge graph 216 and leverage vector search to retrieve search results 224 with semantically similar document content within an electronic documents 1106.

For search retrieval, the search manager engine 150 may receive a search query 212 to search for information within electronic documents by a cloud search service, such as an electronic document management system of system 100 or system 300. The search query 212 may include any free form text in a natural language representation of a human language. The search manager engine 150 may use the search model 1104 to generate a contextualized embedding for the search query 212 to form a search vector 1302.

As shown in FIG. 13, the search manager engine 150 may search a document index 1130 of contextualized embeddings for the electronic documents 1106 with the search vector 1302, which is itself a contextualized embedding of the same type as those stored in the document index 1130. The search process may produce a set of search results 224. The search results 224 may include a set of candidate document vectors 1118 from the set of document vectors 1126. The search results 224 may include candidate document vectors 1118 from the set of document vectors 1126 that are semantically similar to the search vector 1302 of the search query 224. FIG. 13 depicts an example set of two candidate document vectors 1118 (P=2) that includes a candidate document vector 1120 and a candidate document vector 1122 corresponding to the document vector 1202 and the document vector 1206, respectively, of the document index 1130.

Figure 14:
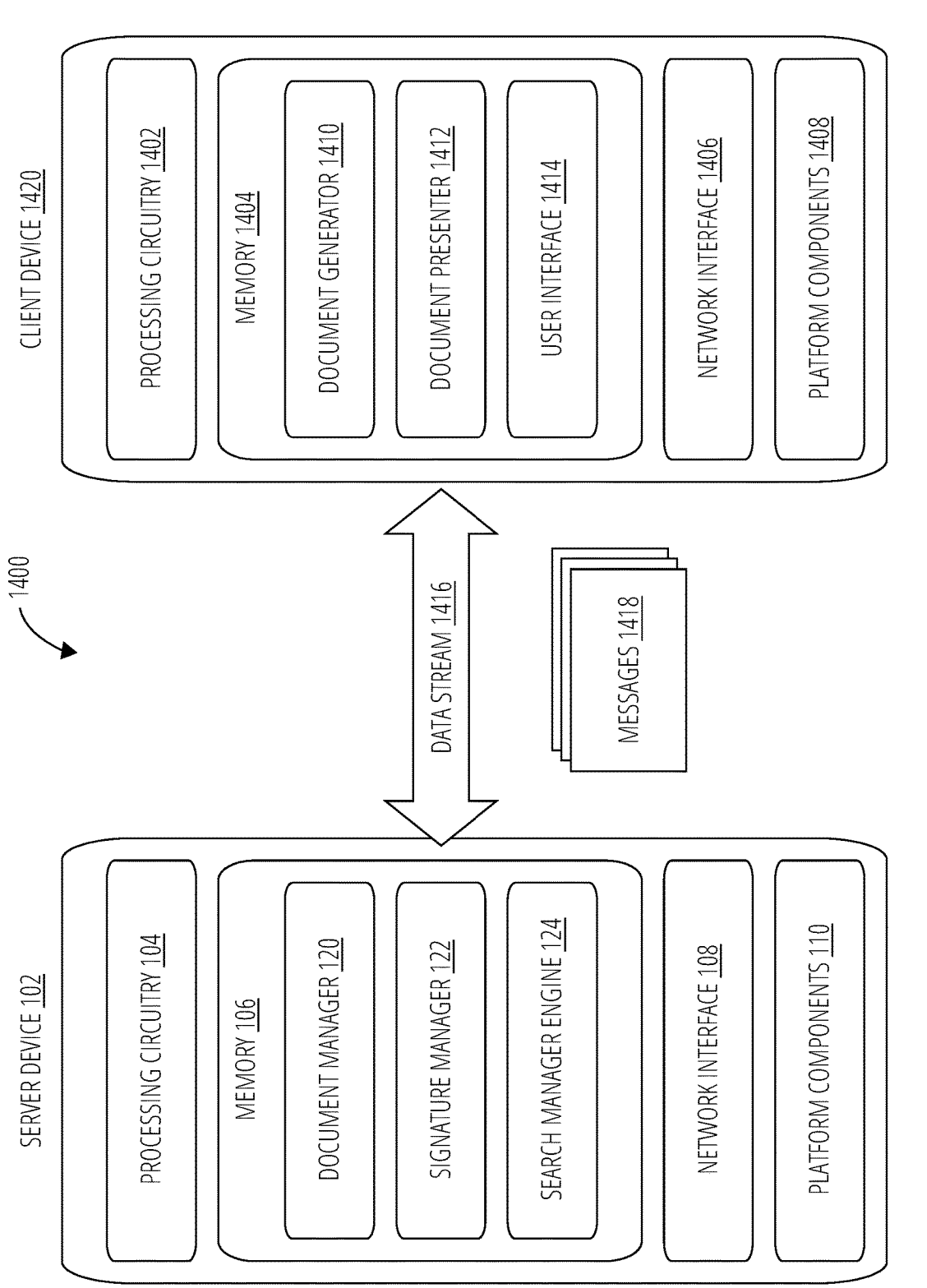
FIG. 14 illustrates a distributed system, according to some embodiments of the current subject matter.

FIG. 14 illustrates a distributed system 1400. The distributed system 1400 may implement the server device 102 communicating a data stream 1416 to a client device 1420. The client device 1420 may comprise an example implementation for the client devices 112, the client devices 116, the client device 312, the client device 314 and/or the client device 318. The client device 1420 may comprise processing circuitry 1402 communicatively coupled to a memory 1404. The memory 1404 may store instructions that when executed by the processing circuitry 1402 may cause the processing circuitry 1402 to perform operations for a document generator 1410, a document presenter 1412 and a user interface 1414. A client 310 may interact with the client device 1420 via the user interface 1414 to generate an electronic document 142 using the document manager 120 of the server device 102. Control and media information to coordinate generation of the electronic document 142 may be transported by one or more messages 1418 over the data stream 1416 via the network interface 1406 over a wired or wireless communication medium. The client 310 may interact with the client device 1420 via the user interface 1414 to render or present an electronic document 142 on an input/output (I/O) device of the platform components 1408, such as touch screen of the client device 1420, to perform various operations on an electronic document 142, such as generate the electronic document 142, present the electronic document 142, attach an electronic signature to the electronic document 142, and so forth.

FIG. 15 illustrates an example process 1500 for searching of electronic documents, according to some embodiments of the current subject matter. The process 1500 may be executed by the system 100 shown in FIG. 1, and in particular, the search manager engine 150, as shown in FIG. 2.

At 1502, the search manager engine 150 may receive a search query (e.g., search query 212) for information within a plurality of electronic documents. The electronic documents may be stored in the source 210. The search query 212 includes one or more search terms, e.g., search terms 214. At 1504, the search manager engine 150 may generate an embedding for the search query to form a search vector.

At 1506, the engine 150 may generate a knowledge graph structure (e.g., knowledge graph 216) using at least one search term. The knowledge graph 216 may be generated using knowledge graph generator 204 using a search term selected from the search terms 214, for example, search term 804. The search term 804 may be associated one or more other terms (e.g., document terms 806). The association of terms may be defined by one or more rules 222 (e.g., rules 808 as shown in FIG. 8).

At 1508, the search manager engine 150 may modify the embedding for the search query using one or more document terms (e.g., terms 806) and/or rules 222 (e.g., rules 808) so that a modified search vector may be generated based on the search vector and the modified embedding.

At 1510, the engine 150 may use the modified vector 220 to retrieve one or more responsive document vectors from the electronic documents stored in source 210. The responsive document vectors may be semantically similar to the modified search vector. At 1512, the engine 150 may generate a response (e.g., search results 224) to the search query 212 based on the one or more responsive document vectors.

FIG. 16 illustrates another example process 1600 for searching of electronic documents, according to some embodiments of the current subject matter. The process 1600 may be executed by the system 100 shown in FIG. 1, and in particular, the search manager engine 150, as shown in FIG. 2.

At 1602, the search manager engine 150 may encode a search query (e.g., search query 212) to form a search vector. The search query 212 may include at least one search term (e.g., search term 804) and may seek information within a plurality of electronic documents, e.g., documents stored in the source 210.

At 1604, the search manager engine 150 may generate a knowledge graph structure (e.g., knowledge graph 216) using the search term. The search term may be associated with at least another term (e.g., one or more document terms 806) in the knowledge graph 216.

At 1606, the engine 150 may modify the search query 212 using one or more document terms 806 to generate a modified search vector and generate a response (e.g., search results 224) to the search query 212 based on one or more responsive document vectors retrieved from the plurality of electronic documents, where the vectors may be semantically similar to the modified search vector, at 1608.

FIG. 17 illustrates yet another example process 1700 for searching of electronic documents, according to some embodiments of the current subject matter. The process 1700 may also be executed by the search manager engine 150, as shown in FIG. 2.

At 1702, the search manager engine 150 may generate a knowledge graph structure (e.g., knowledge graph 216) using at least one search term (e.g., search term 804). The search term may be associated (using one or more document rules 808) with one other term (e.g., one or more document terms 806) in the knowledge graph structure. The search term may be extracted and/or associated with one or more queries (e.g., search query 212) seeking information in the plurality of electronic documents stored in the source 210.

At 1704, the engine 150 may form a search vector using an embedding generated using the search query 212 and the document term(s) 806 and/or rule(s) 808. The search manager engine 150 may then generate a response to the search query 212 based on one or more responsive document vectors retrieved from the plurality of electronic documents and that are semantically similar to the search vector, at 1706.

Figure 18:
FIG. 18 illustrates a computer-readable storage medium, according to some embodiments of the current subject matter.

FIG. 18 illustrates an apparatus 1800. Apparatus 1800 may comprise any non-transitory computer-readable storage medium 1802 or machine-readable storage medium, such as an optical, magnetic or semiconductor storage medium. In various embodiments, apparatus 1800 may comprise an article of manufacture or a product. In some embodiments, the computer-readable storage medium 1802 may store computer executable instructions with which circuitry can execute. For example, computer executable instructions 1804 can include instructions to implement operations described with respect to any logic flows described herein. Examples of computer-readable storage medium 1802 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1804 may include any suitable type of code, such as source code, compiled code, interpreted code, executable code, static code, dynamic code, object-oriented code, visual code, and the like.

FIG. 19 illustrates an embodiment of a computing architecture 1900. Computing architecture 1900 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1900 may have a single processor with one core or more than one processor. Note that the term "processor" refers to a processor with a single core or a processor package with multiple processor cores. In at least one embodiment, the computing architecture 1900 is representative of the components of the system 100. More generally, the computing architecture 1900 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 19, computing architecture 1900 comprises a system-on-chip (SoC) 1902 for mounting platform components. System-on-chip (SoC) 1902 is a point-to-point (P2P) interconnect platform that includes a first processor 1904 and a second processor 1906 coupled via a point-to-point interconnect 1970 such as an Ultra Path Interconnect (UPI). In other embodiments, the computing architecture 1900 may be of another bus architecture, such as a multi-drop bus. Furthermore, each of processor 1904 and processor 1906 may be processor packages with multiple processor cores including core(s) 1908 and core(s) 1910, respectively. While the computing architecture 1900 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 1904 and chipset 1932. Some platforms may include additional components and some platforms may only include sockets to mount the processors and/or the chipset. Furthermore, some platforms may not have sockets (e.g., SoC, or the like). Although depicted as a SoC 1902, one or more of the components of the SoC 1902 may also be included in a single die package, a multi-chip module (MCM), a multi-die package, a chiplet, a bridge, and/or an interposer. Therefore, embodiments are not limited to a SoC.

The processor 1904 and processor 1906 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1904 and/or processor 1906. Additionally, the processor 1904 need not be identical to processor 1906.

Processor 1904 includes an integrated memory controller (IMC) 1920 and point-to-point (P2P) interface 1924 and P2P interface 1928. Similarly, the processor 1906 includes an IMC 1922 as well as P2P interface 1926 and P2P interface 1930. IMC 1920 and IMC 1922 couple the processor 1904 and processor 1906, respectively, to respective memories (e.g., memory 1916 and memory 1918). Memory 1916 and memory 1918 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 1916 and the memory 1918 locally attach to the respective processors (i.e., processor 1904 and processor 1906). In other embodiments, the main memory may couple with the processors via a bus and shared memory hub. Processor 1904 includes registers 1912 and processor 1906 includes registers 1914.

Computing architecture 1900 includes chipset 1932 coupled to processor 1904 and processor 1906. Furthermore, chipset 1932 can be coupled to storage device 1950, for example, via an interface (I/F) 1938. The I/F 1938 may be, for example, a Peripheral Component Interconnect-enhanced (PCIe) interface, a Compute Express Link® (CXL) interface, or a Universal Chiplet Interconnect Express (UCIe) interface. Storage device 1950 can store instructions executable by circuitry of computing architecture 1900 (e.g., processor 1904, processor 1906, GPU 1948, accelerator 1954, vision processing unit 1956, or the like). For example, storage device 1950 can store instructions for server device 102, client devices 112, client devices 116, or the like.

Processor 1904 couples to the chipset 1932 via P2P interface 1928 and P2P 1934 while processor 1906 couples to the chipset 1932 via P2P interface 1930 and P2P 1936. Direct media interface (DMI) 1976 and DMI 1978 may couple the P2P interface 1928 and the P2P 1934 and the P2P interface 1930 and P2P 1936, respectively. DMI 1976 and DMI 1978 may be a high-speed interconnect that facilitates, e.g., eight Giga Transfers per second (GT/s) such as DMI 3.0. In other embodiments, the processor 1904 and processor 1906 may interconnect via a bus.

The chipset 1932 may comprise a controller hub such as a platform controller hub (PCH). The chipset 1932 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1932 may comprise more than one controller hub such as a chipset with a memory controller hub, a graphics controller hub, and an input/output (I/O) controller hub.

In the depicted example, chipset 1932 couples with a trusted platform module (TPM) 1944 and UEFI, BIOS, FLASH circuitry 1946 via I/F 1942. The TPM 1944 is a dedicated microcontroller designed to secure hardware by integrating cryptographic keys into devices. The UEFI, BIOS, FLASH circuitry 1946 may provide pre-boot code. The I/F 1942 may also be coupled to a network interface circuit (NIC) 1980 for connections off-chip.

Furthermore, chipset 1932 includes the I/F 1938 to couple chipset 1932 with a high-performance graphics engine, such as, graphics processing circuitry or a graphics processing unit (GPU) 1948. In other embodiments, the computing architecture 1900 may include a flexible display interface (FDI) (not shown) between the processor 1904 and/or the processor 1906 and the chipset 1932. The FDI interconnects a graphics processor core in one or more of processor 1904 and/or processor 1906 with the chipset 1932.

The computing architecture 1900 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 1954 and/or vision processing unit 1956 can be coupled to chipset 1932 via I/F 1938. The accelerator 1954 is representative of any type of accelerator device (e.g., a data streaming accelerator, cryptographic accelerator, cryptographic co-processor, an offload engine, etc.). One example of an accelerator 1954 is the Intel® Data Streaming Accelerator (DSA). The accelerator 1954 may be a device including circuitry to accelerate copy operations, data encryption, hash value computation, data comparison operations (including comparison of data in memory 1916 and/or memory 1918), and/or data compression. For example, the accelerator 1954 may be a USB device, PCI device, PCIe device, CXL device, UCIe device, and/or an SPI device. The accelerator 1954 can also include circuitry arranged to execute machine learning (ML) related operations (e.g., training, inference, etc.) for ML models. Generally, the accelerator 1954 may be specially designed to perform computationally intensive operations, such as hash value computations, comparison operations, cryptographic operations, and/or compression operations, in a manner that is more efficient than when performed by the processor 1904 or processor 1906. Because the load of the computing architecture 1900 may include hash value computations, comparison operations, cryptographic operations, and/or compression operations, the accelerator 1954 can greatly increase performance of the computing architecture 1900 for these operations.

The accelerator 1954 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 1954. For example, the accelerator 1954 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1954 via a non-posted write (e.g., a deferred memory write (DMWr)). One example of an instruction that atomically submits a work descriptor to the shared work queue of the accelerator 1954 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1954. The dedicated work queue may accept job submissions via commands such as the movdir64b instruction.

Various I/O devices 1960 and display 1952 couple to the bus 1972, along with a bus bridge 1958 which couples the bus 1972 to a second bus 1974 and an I/F 1940 that connects the bus 1972 with the chipset 1932. In one embodiment, the second bus 1974 may be a low pin count (LPC) bus. Various devices may couple to the second bus 1974 including, for example, a keyboard 1962, a mouse 1964 and communication devices 1966.

Furthermore, an audio I/O 1968 may couple to second bus 1974. Many of the I/O devices 1960 and communication devices 1966 may reside on the system-on-chip (SoC) 1902 while the keyboard 1962 and the mouse 1964 may be add-on peripherals. In other embodiments, some or all the I/O devices 1960 and communication devices 1966 are add-on peripherals and do not reside on the system-on-chip (SoC) 1902.

FIG. 20 illustrates a block diagram of an exemplary communications architecture 2000 suitable for implementing various embodiments as previously described. The communications architecture 2000 includes various common communications elements, such as a transmitter, receiver, transceiver, radio, network interface, baseband processor, antenna, amplifiers, filters, power supplies, and so forth. The embodiments, however, are not limited to implementation by the communications architecture 2000.

As shown in FIG. 20, the communications architecture 2000 includes one or more clients 2002 and servers 2004. The clients 2002 may implement a client version of the server device 102, for example. The servers 2004 may implement a server version of the server device 102, for example. The clients 2002 and the servers 2004 are operatively connected to one or more respective client data stores 2008 and server data stores 2010 that can be employed to store information local to the respective clients 2002 and servers 2004, such as cookies and/or associated contextual information.

The clients 2002 and the servers 2004 may communicate information between each other using a communication framework 2006. The communications communication framework 2006 may implement any well-known communications techniques and protocols. The communications communication framework 2006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 2006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2002 and the servers 2004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1—may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

In one aspect, a computer-implemented method includes receiving, using at least one processor, a search query for information within a plurality of electronic documents, the search query includes at least one search term; generating, using the at least one processor, an embedding for the search query to form a search vector; generating, using the at least one processor, a knowledge graph structure using the at least one search term, wherein the at least one search term is associated with at least another term in a plurality of terms in the knowledge graph structure; modifying, using the at least one processor, the embedding for the search query using the at least one another term, and generating a modified search vector using the search vector and the modified embedding; retrieving, using the at least one processor, one or more responsive document vectors from the plurality of electronic documents that are semantically similar to the modified search vector; and generating, using the at least one processor, a response to the search query based on the one or more responsive document vectors.

The method may also include wherein the generating the knowledge graph structure includes identifying, using the search term, one or more rules in a plurality of rules for associating the at least one search term with the at least another term, wherein the plurality of electronic documents includes the plurality of terms; and connecting, using the identified one or more rules, the at least one search term with at the at least another term using at least one connection, wherein the identified one or more rules define the at least one connection.

The method may also include wherein the modifying includes modifying the embedding using the at least one another term and the at least one connection.

The method may also include wherein the plurality of rules define at least one of: one or more connections between terms within an electronic document in the plurality of electronic documents, one or more connections between terms in at least two electronic documents in the plurality of electronic documents, and any combination thereof.

The method may also include wherein the generating the embedding includes encoding the search query to form the search vector.

The method may also include wherein the search query is a natural language representation query.

The method may also include wherein the embedding is a contextualized embedding.

The method may also include wherein the contextualized embedding includes a vector representation of one or more words having contextual information for the one or more words.

The method may also include wherein the contextualized embedding includes at least one of: a word level vector, a sentence level vector, a paragraph level vector, and any combination thereof.

In one aspect, an apparatus may include at least one processor; and at least one memory storing instructions that, when executed by the at least one processor, cause the at least one processor to: encode a search query to form a search vector, the search query includes at least one search term and seeks information within a plurality of electronic documents; generate a knowledge graph structure using the at least one search term, wherein the at least one search term is associated with at least another term in a plurality of terms in the knowledge graph structure; modify the search query using the at least one another term to generate a modified search vector; and generate a response to the search query based on one or more responsive document vectors retrieved from the plurality of electronic documents and that are semantically similar to the modified search vector.

The apparatus may also include wherein generation of the knowledge graph structure includes identifying, using the search term, one or more rules in a plurality of rules for associating the at least one search term with the at least another term, wherein the plurality of electronic documents includes the plurality of terms; and connecting, using the identified one or more rules, the at least one search term with at the at least another term using at least one connection, wherein the identified one or more rules define the at least one connection.

The apparatus may also include wherein modification of the search query includes modifying an embedding generated using the search query using the at least one another term and the at least one connection.

The apparatus may also include wherein the embedding is a contextualized embedding.

The apparatus may also include wherein the contextualized embedding includes a vector representation of one or more words having contextual information for the one or more words.

The apparatus may also include wherein the contextualized embedding includes at least one of: a word level vector, a sentence level vector, a paragraph level vector, and any combination thereof.

The apparatus may also include wherein the plurality of rules define at least one of: one or more connections between terms within an electronic document in the plurality of electronic documents, one or more connections between terms in at least two electronic documents in the plurality of electronic documents, and any combination thereof.

The apparatus may also include wherein the search query is a natural language representation query.

In one aspect, a non-transitory computer-readable storage medium, the computer-readable storage medium including instructions that when executed by at least one processor, cause the at least one processor to: generate a knowledge graph structure using at least one search term, wherein the at least one search term is associated with at least another term in a plurality of terms in the knowledge graph structure, where the at least one search term is associated with one or more queries seeking information in the plurality of electronic documents; form a search vector using an embedding generated using the one or more queries and the at least another term; and generate a response to the one or more queries based on one or more responsive document vectors retrieved from the plurality of electronic documents and that are semantically similar to the search vector.

The computer-readable storage medium may also include wherein generation of the knowledge graph structure includes identifying, using the search term, one or more rules in a plurality of rules for associating the at least one search term with the at least another term, wherein the plurality of electronic documents includes the plurality of terms; and connecting, using the identified one or more rules, the at least one search term with at the at least another term using at least one connection, wherein the identified one or more rules define the at least one connection.

The computer-readable storage medium may also include wherein the plurality of rules define at least one of: one or more connections between terms within an electronic document in the plurality of electronic documents, one or more connections between terms in at least two electronic documents in the plurality of electronic documents, and any combination thereof.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:
receiving, using at least one processor, a search query for information within a plurality of electronic documents, the search query includes at least one search term;
encoding, using the at least one processor, using an encoding machine learning model, in real time, a contextualized embedding for the search query to form a search vector, the contextualized embedding includes a vector representation of the at least one search term having contextual information for the at least one search term;
in response to the receiving of the search query, generating, using the at least one processor, a knowledge graph structure using the at least one search term, wherein the at least one search term is associated with at least another term in a plurality of terms in the knowledge graph structure, wherein the knowledge graph structure includes a base knowledge graph structure generated using another machine learning model based on the plurality of electronic documents prior to the receiving and the at least one search term;
modifying, using the at least one processor, using the encoding machine learning model, in real time, the contextualized embedding for the search query using the at least another term to generate a modified contextualized embedding, wherein the modified contextualized embedding includes encoded one or more terms from the knowledge graph structure and encoded one or more connections between the one or more terms and with the at least one search term from the knowledge graph structure and the at least one search term, and generating a modified search vector using the search vector and the modified contextualized embedding;
searching, using the at least one processor, in real-time, the plurality of electronic documents using the modified search vector and retrieving, using the at least one processor, one or more responsive document vectors from the plurality of electronic documents that are semantically similar to the modified search vector; and
generating, using the at least one processor, a response to the search query based on the one or more responsive document vectors.

2. The method of claim 1, wherein the generating the knowledge graph structure includes
identifying, using the search term, one or more rules in a plurality of rules for associating the at least one search term with the at least another term, wherein the plurality of electronic documents includes the plurality of terms; and
connecting, using the identified one or more rules, the at least one search term with the at least another term using at least one connection, wherein the identified one or more rules define the at least one connection.

3. The method of claim 2, wherein the modifying includes modifying the embedding using the at least another term and the at least one connection.

4. The method of claim 2, wherein the plurality of rules define at least one of: one or more connections between terms within an electronic document in the plurality of electronic documents, one or more connections between terms in at least two electronic documents in the plurality of electronic documents, and any combination thereof.

5. The method of claim 1, wherein the generating the embedding includes encoding the search query to form the search vector.

6. The method of claim 1, wherein the search query is a natural language representation query.

7. The method of claim 1, wherein the contextualized embedding includes at least one of: a word level vector, a sentence level vector, a paragraph level vector, and any combination thereof.

8. An apparatus, comprising:
at least one processor; and
at least one memory storing instructions that, when executed by the at least one processor, cause the at least one processor to:
encode, using an encoding machine learning model, in real time, a contextualized embedding for a search query to form a search vector, the search query includes at least one search term and seeks information within a plurality of electronic documents, the contextualized embedding includes a vector representation of the at least one search term having contextual information for the at least one search term;
in response to receiving the search query, generate a knowledge graph structure using the at least one search term, wherein the at least one search term is associated with at least another term in a plurality of terms in the knowledge graph structure, wherein the knowledge graph structure includes a base knowledge graph structure generated using another machine learning model based on the plurality of electronic documents prior to the receiving and the at least one search term;
modify, using the encoding machine learning model, in real time, the contextualized embedding for the search query using the at least another term to generate a modified contextualized embedding, wherein the modified contextualized embedding includes encoded one or more terms from the knowledge graph structure and encoded one or more connections between the one or more terms and with the at least one search term from the knowledge graph structure and the at least one search term, and generate a modified search vector using the search vector and the modified contextualized embedding; and search, in real-time, the plurality of electronic documents using the modified search vector and generate a response to the search query based on one or more responsive document vectors retrieved from the plurality of electronic documents and that are semantically similar to the modified search vector.

9. The apparatus of claim 8, wherein generation of the knowledge graph structure includes identifying, using the search term, one or more rules in a plurality of rules for associating the at least one search term with the at least another term, wherein the plurality of electronic documents includes the plurality of terms; and connecting, using the identified one or more rules, the at least one search term with the at least another term using at least one connection, wherein the identified one or more rules define the at least one connection.

10. The apparatus of claim 9, wherein modifying the contextualized embedding for the search query includes modifying an embedding generated using the search query using the at least another term and the at least one connection.

11. The apparatus of claim 9, wherein the contextualized embedding includes at least one of: a word level vector, a sentence level vector, a paragraph level vector, and any combination thereof.

12. The apparatus of claim 9, wherein the plurality of rules define at least one of: one or more connections between terms within an electronic document in the plurality of electronic documents, one or more connections between terms in at least two electronic documents in the plurality of electronic documents, and any combination thereof.

13. The apparatus of claim 8, wherein the search query is a natural language representation query.

14. A non-transitory computer-readable storage medium, the computer-readable storage medium including instructions that when executed by at least one processor, cause the at least one processor to:

generate, in response to receiving of one or more queries, a knowledge graph structure using at least one search term, wherein the at least one search term is associated with at least another term in a plurality of terms in the knowledge graph structure, wherein the at least one search term is associated with the one or more queries seeking information in a plurality of electronic documents, wherein the knowledge graph structure includes a base knowledge graph structure generated using another machine learning model based on the plurality of electronic documents prior to the receiving and the at least one search term;

form a search vector, using a contextualized embedding generated, using the one or more queries and the at least another term, wherein formation of the search vector includes encoding, using an encoding machine learning model, in real time, the contextualized embedding to form the search vector, the contextualized embedding includes a vector representation of the at least one search term having contextual information for the at least one search term;

wherein the contextualized embedding is modified, using the encoding machine learning model, in real time, using the at least another term to generate a modified contextualized embedding, wherein the modified contextualized embedding includes encoded one or more terms from the knowledge graph structure and encoded one or more connections between the one or more terms and with the at least one search term from the knowledge graph structure and the at least one search term, and a modified search vector is generated using the search vector and the modified contextualized embedding; and search, in real-time, the plurality of electronic documents using the modified search vector and generate a response to the one or more queries based on one or more responsive document vectors retrieved from the plurality of electronic documents and that are semantically similar to the modified search vector.

15. The computer-readable storage medium of claim 14, wherein generating of the knowledge graph structure includes identifying, using the at least one search term, one or more rules in a plurality of rules for associating the at least one search term with the at least another term, wherein the plurality of electronic documents includes the plurality of terms; and connecting, using the identified one or more rules, the at least one search term with the at least another term using at least one connection, wherein the identified one or more rules define the at least one connection.

16. The computer-readable storage medium of claim 15, wherein the plurality of rules define at least one of: one or more connections between terms within an electronic document in the plurality of electronic documents, one or more connections between terms in at least two electronic documents in the plurality of electronic documents, and any combination thereof.

\* \* \* \* \*